United States Patent [19]
Baba et al.

[11] Patent Number: 5,442,955
[45] Date of Patent: Aug. 22, 1995

[54] MISFIRE DETECTING DEVICE OF MULTICYLINDER INTERNAL COMBUSTION ENGINE

[75] Inventors: Yasutoshi Baba, Chiryu; Yukihide Hashiguchi, Toyota, both of Japan

[73] Assignee: Toyota Jidosha Kabushiki Kaisha, Toyota, Japan

[21] Appl. No.: 226,782

[22] Filed: Apr. 12, 1994

[30] Foreign Application Priority Data

Apr. 21, 1993 [JP] Japan .................... 5-094612

[51] Int. Cl.⁶ ............................... G01M 15/00
[52] U.S. Cl. ......................... 73/117.3; 340/439
[58] Field of Search ........... 73/117.3; 340/438, 439; 364/431.03

[56] References Cited

U.S. PATENT DOCUMENTS

| | | | |
|---|---|---|---|
| 5,088,318 | 2/1992 | Osawa | 73/117.3 |
| 5,216,915 | 6/1993 | Sakamoto | 73/117.3 |
| 5,245,865 | 9/1993 | Kayanuma | 73/117.3 |
| 5,287,737 | 2/1994 | Osawa et al. | 73/117.3 |

FOREIGN PATENT DOCUMENTS

| | | |
|---|---|---|
| 62-228929 | 10/1987 | Japan . |
| 4198834 | 7/1992 | Japan . |
| 4265447 | 9/1992 | Japan . |
| 510199 | 1/1993 | Japan . |
| 552707 | 3/1993 | Japan . |

*Primary Examiner*—Richard E. Chilcot, Jr.
*Assistant Examiner*—Max H. Noori
*Attorney, Agent, or Firm*—Kenyon & Kenyon

[57] ABSTRACT

A misfiring detecting device comprising a sensor for detecting the angular velocity of the crankshaft. The elapsed time required for the crankshaft to rotate by a certain crank angle is detected at the time of combustion at each cylinder. The difference $\Delta T_n$ ($=T_n-T_{n-2}$) of the elapsed time T between cylinders with explosion strokes one interval apart is found and it is judged that a misfire has occurred when the difference $\Delta T_n$ has exceeded a set value $K_1$ and also the pattern of change of the elapsed time ($\Delta TC$) has become the pattern of change of the time of a misfire.

30 Claims, 26 Drawing Sheets

MISFIRE DETECTING DEVICE OF MULTICYLINDER INTERNAL COMBUSTION ENGINE

BACKGROUND OF THE INVENTION

1. Field of the Invention

The present invention relates to a misfire detecting device of a multicylinder internal combustion engine.

2. Description of the Related Art

In a multicylinder internal combustion engine, if one cylinder misfires, the rotational speed of the engine during the explosion stroke of the cylinder which had misfired falls and therefore the time required for the crankshaft to rotate by a certain crank angle during the explosion stroke of the misfiring cylinder becomes longer than that of other cylinders. Accordingly, if the time required for the crankshaft to rotate by a certain crank angle in the explosion stroke of for example the #1 cylinder becomes longer than that of other cylinders, it can be judged that the #1 cylinder has misfired.

When a vehicle is decelerating, however, the time required for the crankshaft to rotate by a certain crank angle continues to increase as well, so the time required for the crankshaft to rotate by a certain crank angle becomes longer than that of other cylinders. Accordingly, as mentioned above, since the time required for the crankshaft to rotate by a certain crank angle becomes longer than that of other cylinders, it is judged that a misfire has occurred. In this case, therefore, a mistaken judgement is made that a misfire has occurred despite no such misfire happening. Therefore, there is known an internal combustion engine which subtracts the increase of time caused by the deceleration operation from the time required for a crankshaft to rotate by a certain crank angle when the vehicle is decelerating and judges that a misfire has occurred when the remaining time has become longer than that of other cylinders (Japanese Unexamined Patent Publication No. 5-52707). In this internal combustion engine, it is possible to detect misfiring with good reliability free from the effect of a deceleration operation even if the vehicle is decelerating.

If, however, a vehicle is being driven on a hilly road and the vehicle is operated at a specific speed where the vehicle as a whole resonates, the slip action of the drive wheels and the grip action of the drive wheels following that will be cyclically repeated and the rotational speed of the engine will fluctuate. Further, the rocking of the engine body will be amplified and it will appear as if the engine rotational speed were fluctuating itself. The fluctuation of the engine rotational speed at this time, however, is different from the fluctuation of the engine rotational speed during a deceleration operation, so as mentioned above the time required for the crankshaft to rotate by a certain crank angle following the firing of a certain cylinder will become longer, temporarily, than that of other cylinders even if the increase of the time caused by the deceleration operation is subtracted from the time required for the crankshaft to rotate by a certain crank angle. Accordingly, it will be erroneously judged that a misfire has occurred even though it has not.

SUMMARY OF THE INVENTION

The object of the present invention is to provide a misfire detecting device which is able to reliably detect the occurrence of a misfire.

According to a first aspect of the present invention, there is provided a misfire detecting device of a multicylinder internal combustion engine provided with angular velocity detecting means for detecting the angular velocity of a crankshaft at the time of combustion in cylinders, angular velocity difference calculating means for calculating the difference in angular velocities of the crankshaft between firings of the cylinders, provisional judging means for provisionally judging if there is a possibility that a misfire is occurring when the calculated difference exceeds a set value, storing means for storing in advance a pattern of change of the angular velocity of the crankshaft at the time of occurrence of a misfire, and final judging means for finally judging that a misfire is occurring when the provisional judging means has provisionally judged that there is a possibility that a misfire has occurred and the angular velocity of the crankshaft has changed in accordance with a pattern of change stored in the storing means.

According to a second aspect of the present invention, there is provided a misfire detecting device of a multicylinder internal combustion engine provided with angular velocity detecting means for detecting the angular velocity of a crankshaft at the time of combustion in the various cylinders of the engine, angular velocity difference calculating means for calculating the difference in angular velocities of the crankshaft between firings of the cylinders, first provisional judging means for provisionally judging if there is a possibility that a misfire has occurred when the calculated difference exceeds a set value, storing means for storing in advance a pattern of change of the angular velocity of the crankshaft at the time of occurrence of a misfire, second provisional judging means for provisionally judging there is a greater possibility that a misfire has occurred when the first provisional judging means has provisionally judged that there is a possibility that a misfire has occurred and the angular velocity of the crankshaft has changed in accordance with a pattern of change stored in the storing means, count means for counting the number of times it has been provisionally judged by the second provisional judging means that there is a greater possibility that a misfire has occurred in a certain period and the number of times it has been provisionally judged by the second provisional judging means that no misfire has occurred in that certain period, and final judging means for finally judging that a misfire has occurred when the ratio of the number of times the second provisional judging means has provisionally judged that no misfiring is occurring to the number of times the second provisional judging means has provisionally judged that misfiring has occurred is lower than a set value.

According to a third aspect of the present invention, there is provided a misfire detecting device of a multicylinder internal combustion engine provided with angular velocity detecting means for detecting the angular velocity of a crankshaft at the time of combustion in cylinders, angular velocity difference calculating means for calculating the difference in angular velocities of the crankshaft between firings of the cylinders, provisional judging means for provisionally judging if there is a possibility that a misfire has occurred when the calculated difference exceeds a set value, storing means for storing in advance a pattern of change of the angular velocity of the crankshaft at the time of occurrence of a misfire, final judging means for finally judging that a misfire has occurred when the provisional judging means has provisionally judged that there is a possibility that a misfire has occurred and the angular velocity of the crankshaft has changed in accordance with a pattern of change stored in the storing means, and successive misfire judging means for judging that successive misfire is occurring in a specific cylinder when it is provisionally judged by the provisional judging means that there is a possibility that a misfire has occurred successively in the specific cylinder.

The present invention may be more fully understood from the description of the preferred embodiments of the invention set forth below together with the accompanying drawings.

DESCRIPTION OF THE PREFERRED EMBODIMENTS

Figure 1:
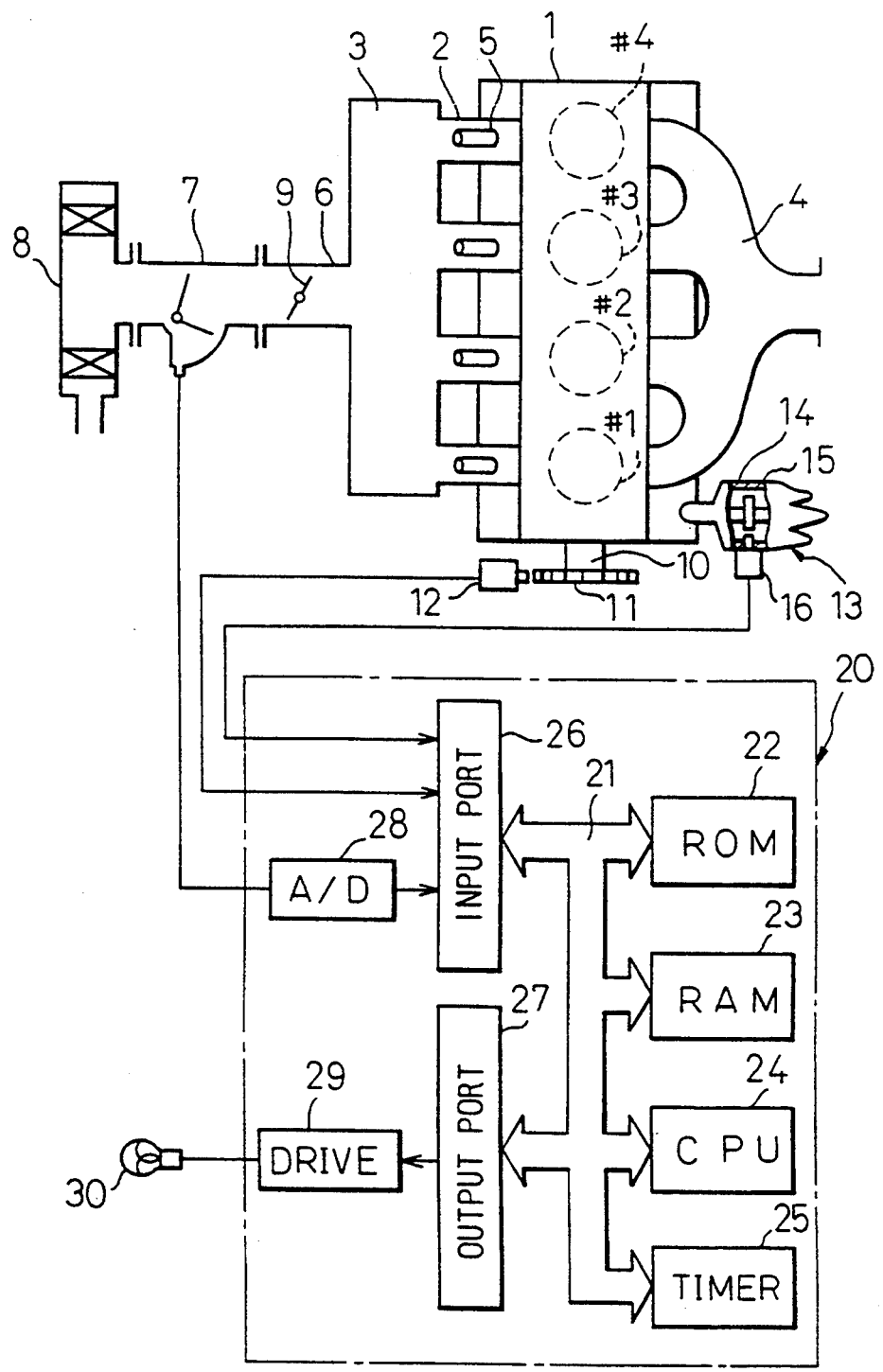
FIG. 1 is an overall view of an internal combustion engine.

FIG. 1 shows the case of application of the present invention to a four-cylinder internal combustion engine.

Referring to FIG. 1, the internal combustion engine is provided with four cylinders: the #1 cylinder, #2 cylinder, #3 cylinder, and #4 cylinder. Each cylinder is connected to a surge tank 3 through a corresponding branch pipe 2 at one end and is connected to an exhaust manifold 4 at the other end. In each branch pipe 2 is attached a fuel injector 5. The surge tank 3 is connected through an intake duct 6 and an air flow meter 7 to an air cleaner 8. A throttle valve 9 is arranged inside the intake duct 6. On the other hand, a disc-shaped rotor 11 is attached to a crankshaft 10 of the internal combustion engine 1. A crank angle sensor 12 is arranged facing the outer circumference of the rotor 11. Further, a distributor 13 is mounted in the internal combustion engine 1, which distributor 13 is provided with a shaft 14 which rotates at a speed ½ that of the crankshaft 10. This shaft 14 has affixed to it a disc-shaped rotor 15. A top dead center sensor 16 is arranged facing the outer circumference of the rotor 15. The crank angle sensor 12 and the top dead center sensor 16 are connected to an electronic control unit 20.

The electronic control unit 20 is comprised of a digital computer and is provided with a read only memory (ROM) 22, a random access memory (RAM) 23, a microprocessor (CPU) 24, a timer 25, an input port 26, and an output port 27 connected with each other through a bidirectional bus 21. The timer 25 is comprised of a free running counter which continues a count up operation when power is being supplied to the electronic control unit 20. Accordingly, the count of the free running counter shows the time. The air flow meter 7 generates an output voltage proportional to the amount of air fed to the engine cylinder. This output voltage is input through an analog-to-digital (AD) converter 28 to the input port 26. Further, the output signals of the crank angle sensor 12 and the top dead center sensor 16 are input to the input port 26. On the other hand, the output port 27 is connected through a corresponding drive circuit 29 to an alarm lamp 30 which shows which of the #1 to #4 cylinders has misfired.

Figure 2:
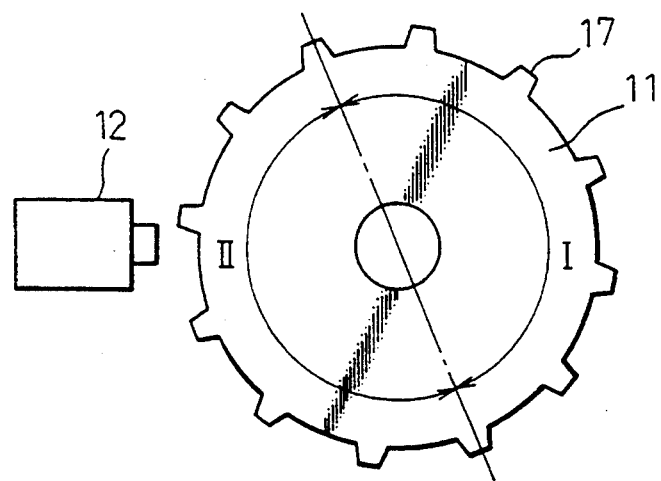
FIG. 2 is a front view of a rotor.

FIG. 2 shows the rotor 11 and the crank angle sensor 12. In the embodiment shown in FIG. 2, the rotor 11 has 12 outer teeth 17 formed at equiangular intervals of 30 degrees. The crank angle sensor 12 is comprised of an electromagnetic pickup which issues an output pulse when confronting an outer tooth 17. Accordingly, in the embodiment shown in FIG. 2, if the crankshaft 10 (FIG. 1) turns, that is, if the rotor 11 turns, the crank angle sensor 12 issues an output pulse every time the crankshaft 10 turns 30 degrees. This output pulse is input to the input port 26 (FIG. 1).

Figure 3:
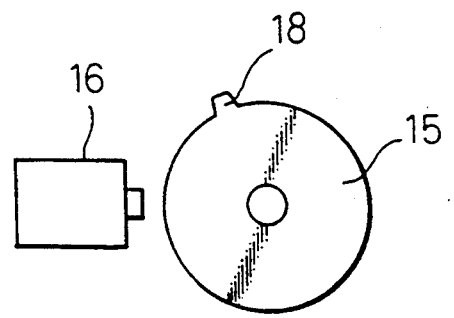
FIG. 3 is another front view of a rotor.

On the other hand, FIG. 3 shows a rotor 15 and a top dead center sensor 16. In the embodiment shown in FIG. 3, the rotor 15 has a single projection 18. The top dead center sensor 16 is comprised of an electromagnetic pickup which issues an output pulse when it faces this projection 18. As mentioned earlier, the rotor 15 is made to rotate at a rotational speed one-half that of the crankshaft 10 (FIG. 1). Accordingly, if the crankshaft 10 rotates, the top dead center sensor 16 issues an output pulse each time the crankshaft 10 rotates 720 degrees. This output pulse is input to the input port 26 (FIG. 1). The position of the projection 18 is such that it faces the top dead center sensor 16 when for example the #1 cylinder reaches the top dead center of the explosion stroke. Therefore, when the #1 cylinder reaches the top dead center of the explosion stroke, the top dead center sensor 16 issues an output pulse. The CPU 24 calculates the current crank angle based on the output pulse of the top dead center sensor 16 and the output pulse of the crank angle sensor 12 and, further, calculates the engine rotational speed based on the output pulses of the crank angle sensor 12.

When any one of the cylinders misfires and the engine rotational speed drops, the elapsed time required for the crankshaft to turn by a certain crank angle becomes longer. Therefore, in this embodiment according to the present invention, the elapsed time required for the crankshaft to turn by a certain crank angle during the combustion at each of the cylinders is detected and a judgement is made as to whether a misfire has occurred based on the elapsed time. Note that if a misfire occurs and the engine rotational speed N falls, the elapsed time becomes longer. On the other hand, the angular velocity of the crankshaft 10 is proportional to the engine rotational speed N, so the angular velocity of the crankshaft 10 is inversely proportional to the elapsed time.

Figure 4:
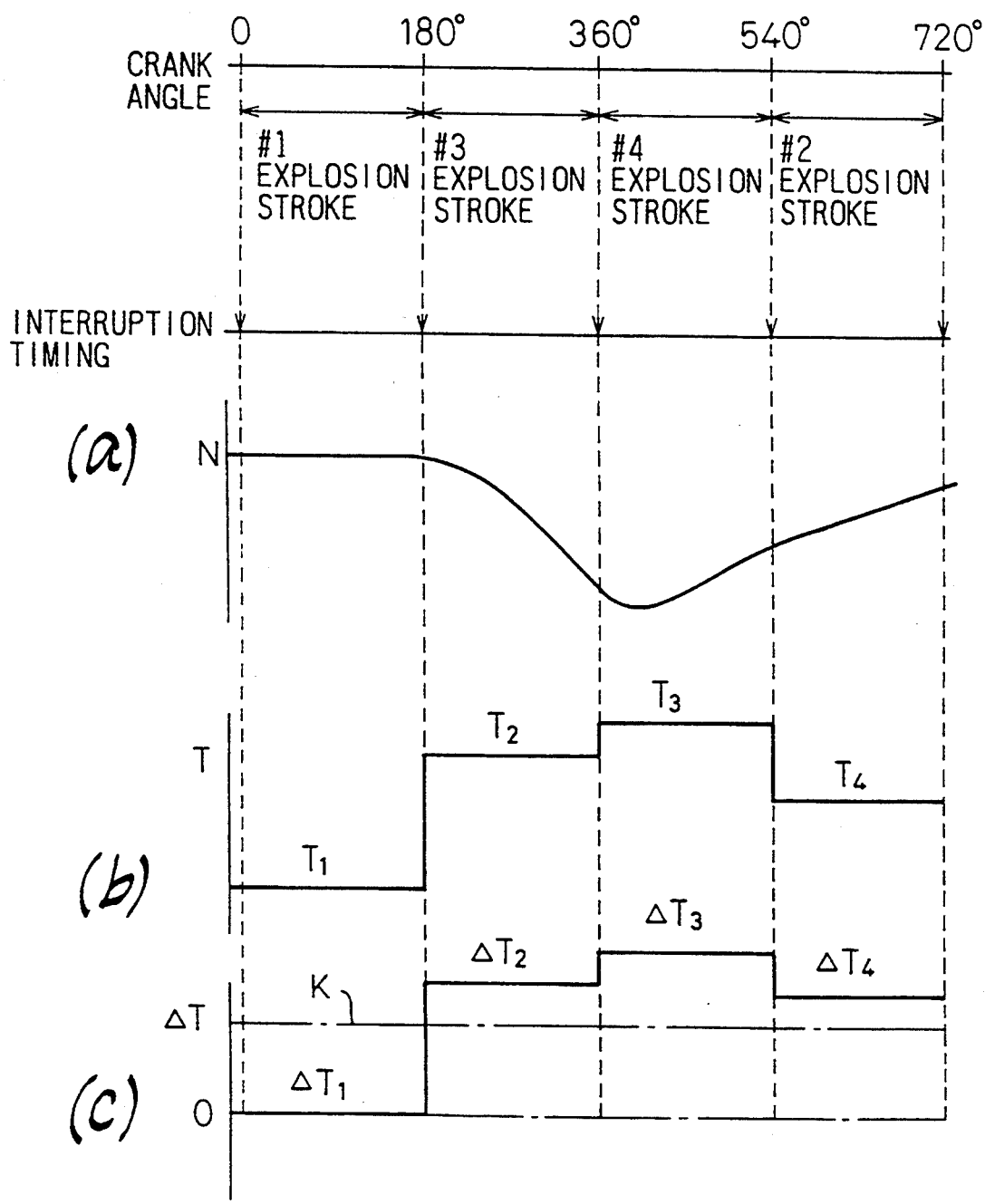
FIG. 4 is a time chart of the changes in the elapsed time etc. in the explosion strokes during misfiring.
Figure 5:
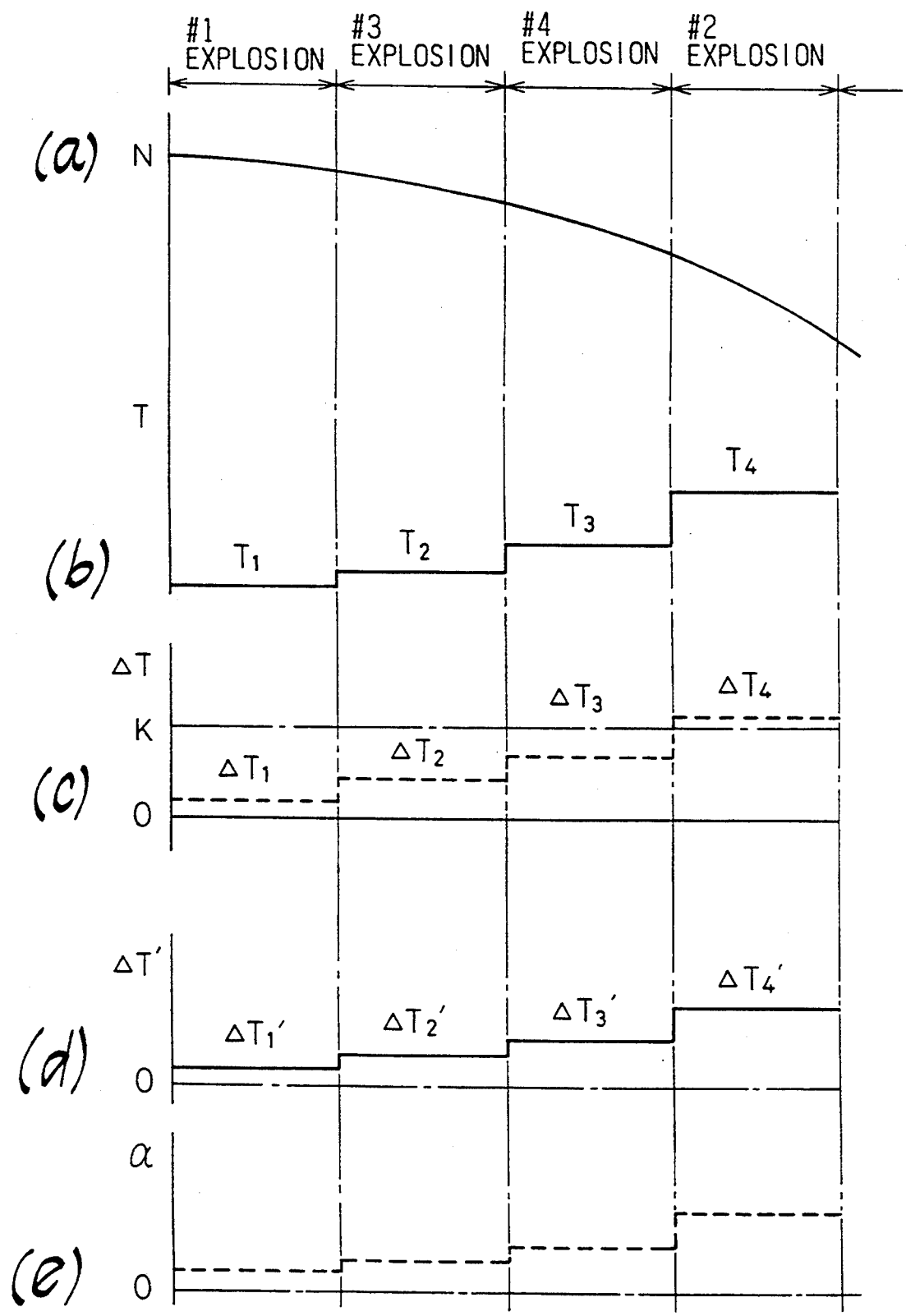
FIG. 5 is a time chart of the changes in the estimated value α.
Figure 6:
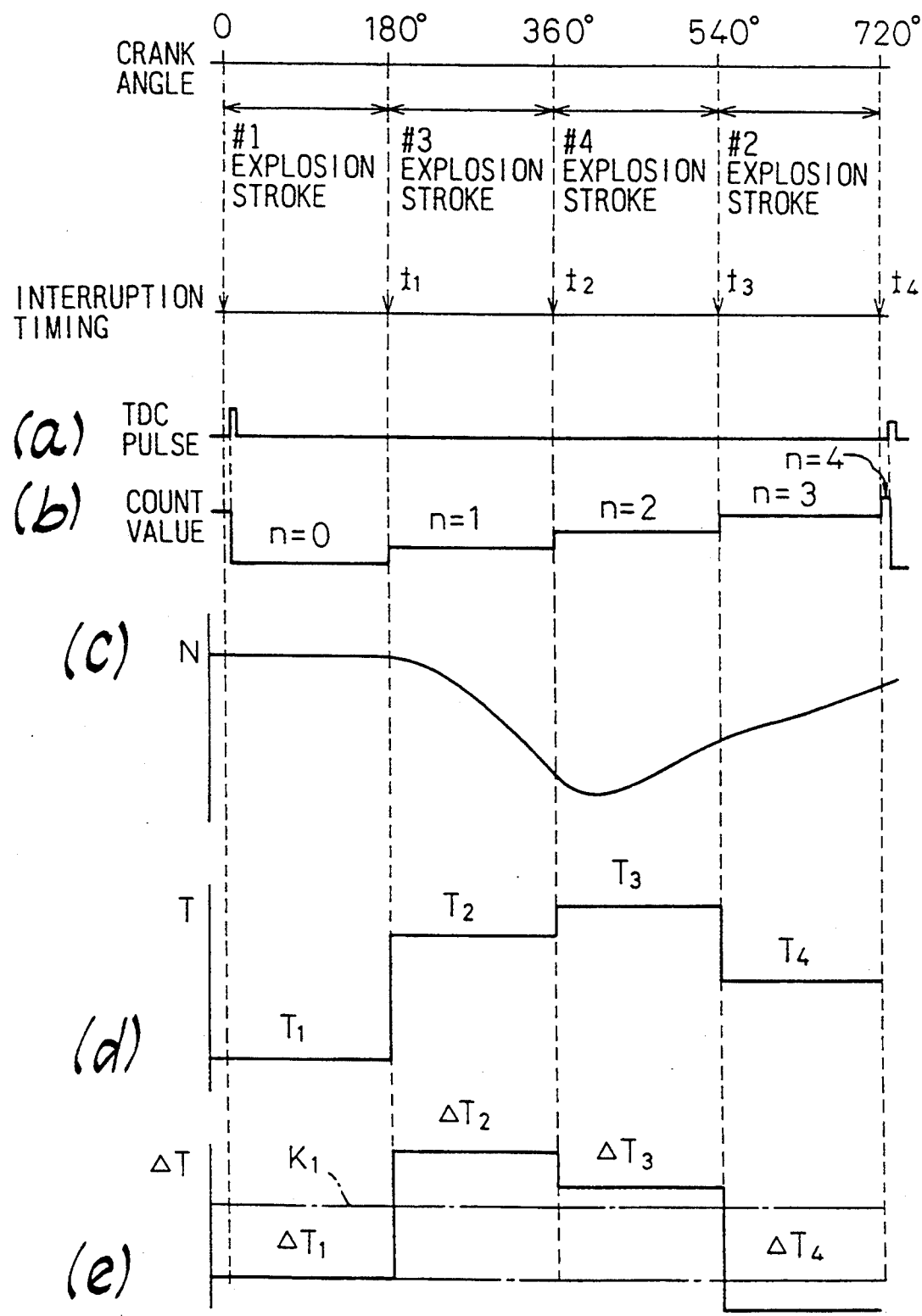
FIG. 6 is a time chart of a specific example of the use of the method of detecting a misfire according to the present invention.

Next, an explanation will be made of the basic method for detecting a misfire using the elapsed time with reference to FIG. 4 to FIG. 6. Note that FIGS. 4 to 6 show the example of a four-cylinder internal combustion engine with a 1-3-4-2 ignition sequence. FIG. 4 shows the case of a misfire occurring in the #3 cylinder, while N shows the change in the engine rotational speed at that time. Further, $T_1$ shows the time required for the crankshaft 10 to turn by 180 degrees crank angle the time of the explosion stroke after the #cylinder has fired. Similarly, $T_2$ shows the time of the explosion stroke of the #3 cylinder, $T_3$ shows the time of the explosion stroke of the #4 cylinder, and $T_4$ shows the time of the explosions stroke of the #2 cylinder.

As shown in FIG. 4, assuming that a misfire occurs in the #3 cylinder, the engine rotational speed N starts to drop. Even if the #3 cylinder misfires and the engine rotational speed N drops, the engine rotational speed N would seemingly immediately rise if the combustion in the succeeding cylinders proceeds normally. In actuality, however, as shown in FIG. 4, the engine rotational speed N continues to fall while the crankshaft 10 is turning by about 180 degrees crank angle after the misfire at the #3 cylinder. Only then does the engine rotational speed N start to rise. That is, the engine rotational speed N is held constant by the combustion pressure at the explosion strokes. If a misfire occurs at the #3 cylinder, however, the drive force given to the engine during the explosion stroke of the #3 cylinder, that is, over a crank angle of about 180 degrees, falls, so the engine rotational speed continues to fall for the period over which the drive force given to the engine falls, that is, the period over which the crankshaft 10 rotates by 180 degrees crank angle. Accordingly, if a misfire occurs in the #3 cylinder, the elapsed time $T_2$ of the explosion stroke of the #3 cylinder increases considerably, the elapsed time $T_3$ of the explosion stroke of the #4 cylinder increases even further and then the elapsed time gradually falls.

On the other hand, $\Delta T$ in FIG. 4 shows the difference in elapsed time with one further separated explosion stroke. For example, looking at the #4 cylinder, $\Delta T_3$ is $(T_3-T_1)$, that is, the difference of the elapsed times $T_3$ and $T_1$ of the explosion strokes of the #4 cylinder and the #1 cylinder. Therefore, the difference $\Delta T$ shows the difference in the angular velocity of the crankshaft 10 with one further separated explosion stroke. As shown in FIG. 4, if a misfire occurs in the #3 cylinder, the elapsed time $T_2$ of the explosion stroke of the #3 cylinder increases considerably over the elapsed time $T_4$ of the explosion stroke of the #2 cylinder before the misfiring. On the other hand, the elapsed time $T_3$ of the explosion stroke of the #4 cylinder increases further over the elapsed time $T_1$ of the explosion stroke of the #1 cylinder, so the difference $\Delta T_3$ becomes even larger. After this, the elapsed time falls, so the difference $\Delta T$ becomes smaller. Therefore, the difference $\Delta T_3$ corresponding to the explosion stroke of the #4 cylinder becomes the greatest and it is possible to discriminate that the misfire had occurred in the one cylinder before the cylinder with the greatest $\Delta T$ among the cylinders exceeding the set value K shown in FIG. 4, that is, the #3 cylinder.

If a deceleration operation is begun and as shown in FIG. 5, the engine rotational speed N is made to fall increasingly faster. This causes the rate of increase of the elapsed time T of subsequent explosion strokes to accelerate as well and thus the difference $\Delta T$ with the elapsed time of the one further separated explosion stroke gradually increases as shown by the broken line. As a result, despite no misfire having occurred in the #2 cylinder, the difference $\Delta T_4$ ends up exceeding the set value K and thus an erroneous judgement is made. In this case, to prevent such an erroneous judgement, it is sufficient to subtract a difference $\Delta T'$ (see FIG. 5) representing the increase in the time of the explosion stroke corresponding to the deceleration operation from the difference $\Delta T$. By comparing the result of this subtraction $(\Delta T - \Delta T')$ with the set value K, erroneous judgements can be eliminated.

The difference $\Delta T$ which can actually be detected, however, includes $T'$ and it is not known to which extent $\Delta T'$ is contained in $\Delta T$. Accordingly, it becomes necessary to estimate $\Delta T'$. As shown in FIG. 4, however, if a misfire occurs in the #3 cylinder, the $\Delta T$ of the cylinder before the #3 cylinder ($\Delta T_1$ in FIG. 4) becomes zero when deceleration operation is performed. If the $\Delta T$ of the cylinder before the #3 cylinder is not zero, this means that a deceleration operation is underway. Accordingly, it can be estimated to what extent $\Delta T'$ is contained in the $\Delta T$ from the change in the $\Delta T$ in the cylinder before the #3 cylinder.

In this way, when a misfire occurs in the #3 cylinder in a four-cylinder internal combustion engine, it becomes possible to estimate the $\Delta T'$ from the difference $\Delta T$ in the cylinder performing combustion before the #3 cylinder. In this embodiment of the present invention, the estimated value $\alpha$ of $\Delta T'$ is calculated based on the following equation:

$$\Delta t_n = T_{n-1} - T_{n-3}$$

$$\alpha = (\Delta t_n + \Delta t_{n-1})/2$$

Here, n shows the cylinder which has been judged to have misfired. Accordingly, in FIG. 4, it shows the #3 cylinder. On the other hand, (n-1) shows the cylinder which performed combustion before the cylinder judged to have misfired, and (n-2) shows the cylinder which performed combustion before that one. Accordingly, (n-1) shows the cylinder which performed combustion before the misfiring #3 cylinder, that is, the #1 cylinder, and (n-3) shows the #4 cylinder. Therefore, $\Delta t_n$ ($= T_{n-1} - T_{n-3}$) shows the difference between the time of the explosion stroke T of two cylinders performing combustion before the misfiring cylinder and separated in explosion stroke by 360 degrees crank angle. In finding the difference for two sets of cylinders separated by 360 degrees crank angle, the mean value of the differences becomes $(\Delta T_n + \Delta t_{n-1})/2$. That is, if a deceleration operation is performed, the difference $\Delta T$ shifts by exactly this mean value for each 360 degrees crank angle and therefore the estimated value $\alpha$ of the $\Delta T'$ becomes as expressed by the above equation.

If a deceleration operation is started and the engine rotational speed N falls in an accelerated manner, the elapsed time T increases along with this, so $\Delta t_n$ also increases and therefore the estimated value $\alpha$ of $\Delta T'$ increases as well. Therefore, the estimated value $\alpha$ shows the change in the $\Delta T'$ well. FIG. 5 shows the change in the estimated value $\alpha$ when $\Delta T'$ changes.

FIG. 6 is a time chart of a specific example of the method of detection of a misfire. Note that in FIG. 6, the crank angle is shown using as a reference the explosion top dead center of the #1 cylinder.

When the #1 cylinder reaches the explosion top dead center, the top dead center sensor 16, as shown in FIG. 6, issues a top dead center pulse. When this top dead center pulse is issued, the count value n of the counter is made zero. On the other hand, as shown by $t_1$, $t_2$, $t_3$, and $t_4$ in FIG. 6, an interruption routine is executed at every 180 degrees crank angle at the time of the start of the explosion stroke of the cylinders. When this interruption routine is executed, the count value n of the counter is incremented by 1 and at the same time the elapsed times $T_1$, $T_2$, $T_3$, and $T_4$ from the previous interruption to the current interruption are calculated. That is, at the time of the interruption shown by $t_1$, the elapsed time $T_1$ of the explosion stroke in the #1 cylinder is calculated, at the time of the interruption shown by $t_2$, the elapsed time $T_2$ of the explosion stroke in the #3 cylinder is calculated, at the time of the interruption shown by $t_3$, the elapsed time $T_3$ of the explosion stroke in the #4 cylinder is calculated, and at the time of the interruption shown by $t_4$, the elapsed time $T_4$ of the explosion stroke in the #2 cylinder is calculated.

Further, the difference $\Delta T$ of the elapsed time T of the explosion stroke one stroke away is calculated at each interruption. That is, at the time of the interruption shown by $t_1$, $\Delta T_1$ ($=T_1-T_3$) is calculated, at the time of the interruption shown by $t_2$, $\Delta T_2$ ($=T_2-T_4$) is calculated, at the time of the interruption shown by $t_3$, $\Delta T_3$ ($=T_3-T_1$) is calculated, and at the time of the interruption shown by $t_4$, $\Delta T_4$ ($=T_4-T_2$) is calculated. Further, at the time of each interruption, the estimated value $\alpha$ is subtracted from the differences $\Delta T$ calculated as mentioned above so as to eliminate the effect of the deceleration operation. The differences $\Delta T_1$, $\Delta T_2$, $\Delta T_3$, and $\Delta T_4$ minus the estimated value $\alpha$ are shown in FIG. 6. The difference $\Delta T$ obtained by subtracting the estimated value $\alpha$ becomes biggest at the cylinder in which the misfire occurred (#3 cylinder) as shown in FIG. 6, and therefore it becomes possible to judge that a misfire has occurred at the cylinder with the largest difference $\Delta T$ over the set value $K_1$.

Note that when using the rotor 11 and the crank angle sensor 12 as shown in FIG. 2 so as to find the differences $\Delta T$ and $\Delta t$ from the output pulse of the crank angle sensor 12, if there is a difference in the intervals between the outer teeth 17 due to manufacturing error in the rotor 11, the elapsed time T will change accordingly and therefore there is a risk of erroneous judgement that a misfire has occurred or a deceleration operation is underway even if the engine is being operated at a constant speed. In the embodiment according to the present invention, however, when finding the differences $\Delta T_n$ and $\Delta t_n$ in elapsed time in cylinders separated by 360 degrees crank angle, the $\Delta T_n$ and $\Delta t_n$ in these cylinders are calculated based on the outer teeth 17 of the same regions I and II shown in FIG. 2. Accordingly, even if there is manufacturing error in the rotor 11, the manufacturing error does not appear at all in the differences $\Delta T_n$ and $\Delta t_n$ and therefore it is possible to completely avoid an erroneous judgement that a misfire has occurred or a deceleration operation has been performed regardless of the engine being operated at a constant speed.

The above explanation related to the basic method of detection of a misfire used in the present invention. If this basic method of detection of a misfire is used, then it becomes possible to detect a misfire free from the effect of a deceleration operation. In actuality, however, even if the effect of a deceleration operation is eliminated in this way, if a vehicle is being driven on a hilly road and if at that time the vehicle is being driven at a specific speed at which the vehicle as a whole resonates, then the difference $\Delta T$ will end up exceeding the set value $K_1$ and thus an erroneous judgement will sometimes be made that a misfire has occurred. Next, an explanation will be made about this referring to FIG. 7 and FIG. 8.

Figure 7:
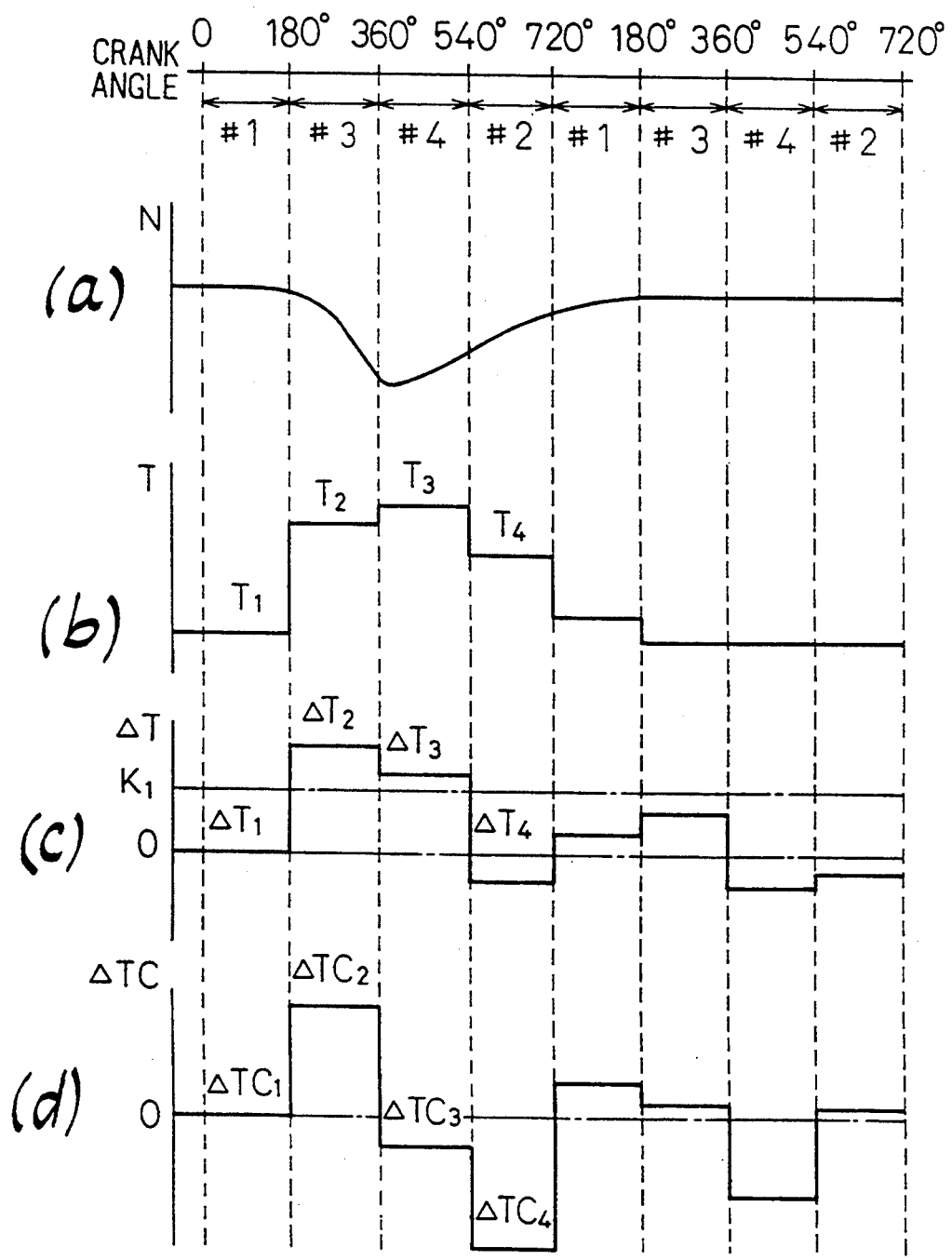
FIG. 7 is a time chart of the changes, etc., in the ΔTC during to a misfire.
Figure 8:
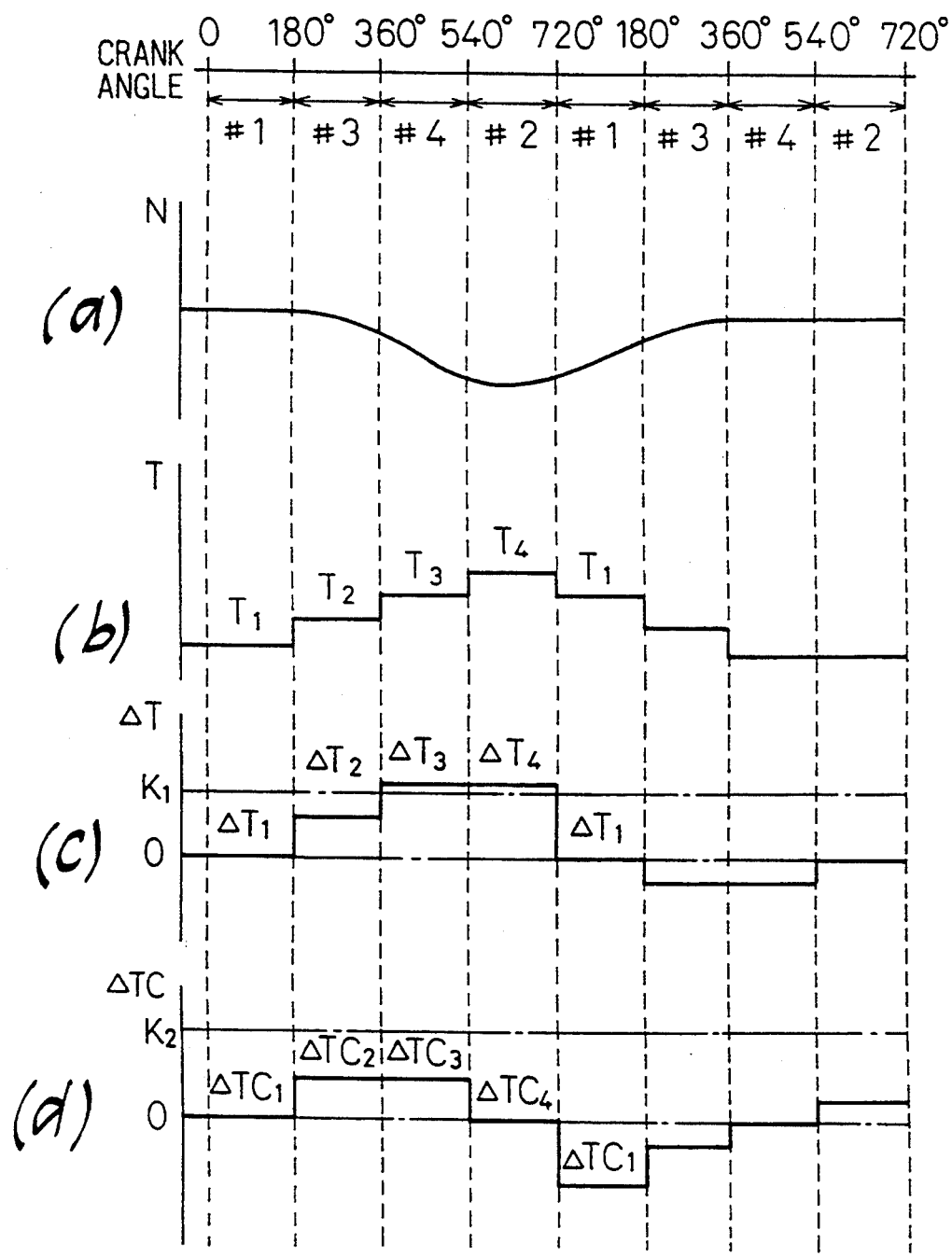
FIG. 8 is a time chart of the changes, etc., in the ΔTC at the time of driving on a hilly road.

FIG. 7 shows the case where a misfire has occurred in the #3 cylinder in the same way as the case shown in FIG. 6. In this case, as mentioned earlier, a misfire occurs at the cylinder with the largest difference $\Delta T$ exceeding the set value $K_1$. On the other hand, FIG. 8 shows the case where a vehicle is being driven on a hilly road and the engine rotational speed N temporarily falls. In this case as well, as shown in FIG. 8, the difference $\Delta T$ ends up exceeding the set value $K_1$ and therefore an erroneous judgement is made that misfiring has occurred at one of the #4 cylinder or the #2 cylinder. Therefore, to avoid such an erroneous judgement, it becomes necessary to discriminate whether the difference $\Delta T$ has exceeded the set value $K_1$ due to misfiring or due to driving on a hilly road.

As shown in FIG. 8, however, when driving on a hilly road, the engine rotational speed N changes like a sine wave and thus the elapsed time T slowly rises and slowly falls. As opposed to this, when a misfire occurs, the engine rotational speed N drops sharply, then slowly rises and therefore the elapsed time T first rises sharply and then changes slowly. That is, the pattern of change of the elapsed time T at the time of a misfire sometimes differs considerably from the pattern of change of the elapsed time T at the time of driving on a hilly road. Accordingly, if the pattern of change of the elapsed time T becomes the pattern of change of a misfire shown in FIG. 7 when the difference $\Delta T$ exceeds the set value $K_1$, it means that a misfire has occurred, while if the pattern of change of the elapsed time T becomes the pattern of change shown in FIG. 8 when the difference $\Delta T$ exceeds the set value $K_1$, it means that no misfire has occurred.

In this way, it is possible to judge if a misfire is occurring by determining whether the pattern of change of the elapsed time T is the pattern of change of a misfire shown in FIG. 7. Therefore, in this embodiment of the present invention, note is taken of the fact that the difference $\Delta T$ grows sharply when a misfire has occurred and differentiation is performed according to whether the pattern of change of the elapsed time T is the pattern of change of the time of a misfire shown in FIG. 7 based on the following equation:

$$\Delta TC_n = \Delta T_n - \Delta T_{n-1} = [(T_n - T_{n-2}) - (T_{n-1} - T_{n-3})] = [(T_n - T_{n-1}) - (T_{n-2} - T_{n-3})]$$

That is, if a misfire occurs at the #3 cylinder as shown in FIG. 7, $\Delta T_2$ increases rapidly compared with $\Delta T_1$, so $\Delta TC_2$ becomes considerably larger. Further, $\Delta T_4$ falls rapidly compared with $\Delta T_3$, so $\Delta TC_4$ becomes considerably smaller. As opposed to this, when no misfire has occurred, as shown in FIG. 8, $\Delta T_3$ does not become that much larger than $\Delta T_2$, so $\Delta TC_3$ does not become that large and $\Delta T_1$ does not fall that much compared with $\Delta T_4$, so $\Delta TC_1$ does not become that small. Further, when a misfire occurs, $\Delta TC_3$ becomes considerably smaller than $\Delta TC_2$, while when no misfire occurs, $\Delta TC_4$ does not fall that much compared with $\Delta TC_3$.

Accordingly, when $\Delta TC_2$ becomes much larger than $|\Delta TC_1|$, $\Delta TC_2$ becomes much larger than $|TC_3|$, and $\Delta TC_2$ is somewhat smaller than $|\Delta TC_4|$, it may be judged that a misfire has occurred.

Figure 9A:
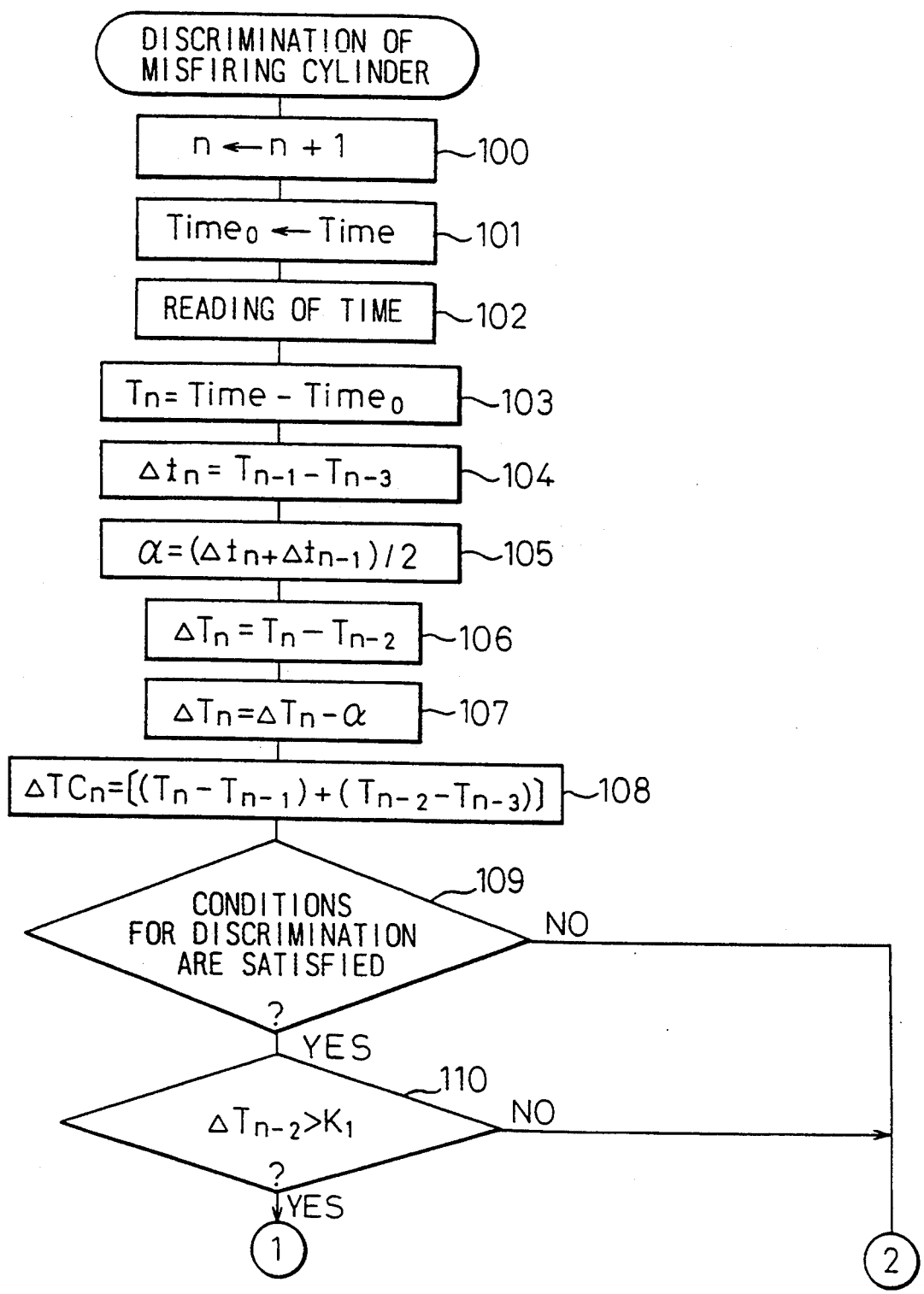
FIGS. 9A and 9B are flow charts for discrimination of a misfiring cylinder.
Figure 9B:
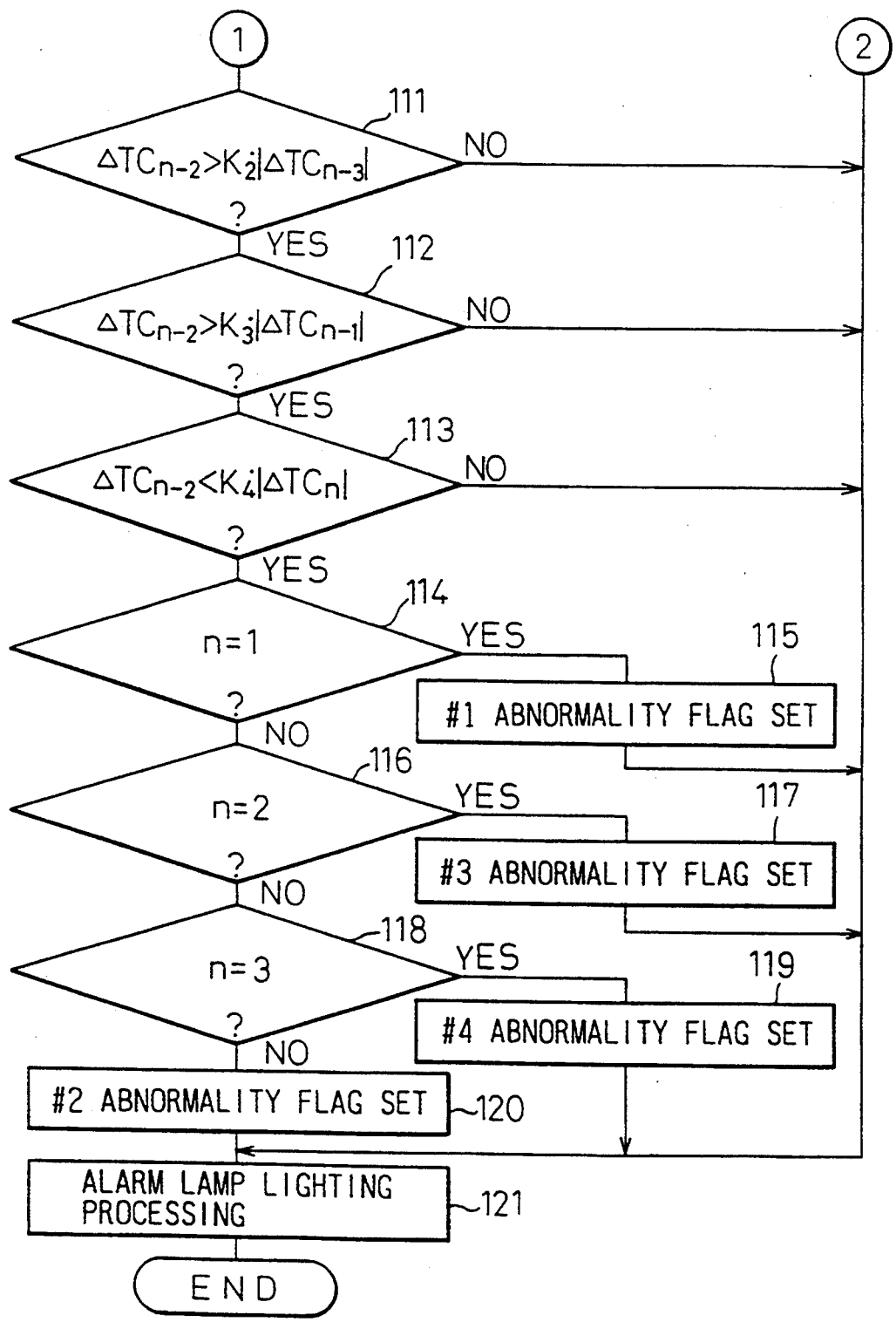

FIG. 9A and FIG. 9B show the routine for executing the method for determination of a misfire explained up to here. The routine is executed by an interruption routine every 180 degrees. Note that in this routine, it is judged whether there is a misfire in the cylinder ($\Delta T_{n-2}$) which performed the combustion two cylinders before the one with a difference of $\Delta T_n$ when calculating the $\Delta T_n$.

Referring to FIG. 9A and FIG. 9B, first, at step 100, the count value n is incremented by one. Then, at step 101, the time TIME is made $TIME_0$. Next, at step 102, the current time TIME counted by the timer 25 is read in. Accordingly, the $TIME_0$ at step 101 expresses the time at the previous interruption. Next, at step 103, the elapsed time $T_n$ is calculated by subtracting the time $TIME_0$ at the previous interruption from the current time TIME. Next, at step 104, the difference $\Delta t_n (= T_{n-1} - T_{n-3})$ for finding the estimated value $\alpha$ is calculated. Next, at step 106, the difference $\Delta T_n$ of the elapsed time is calculated by subtracting the elapsed time $T_{n-2}$ calculated at the time of the interruption two interruptions ago from the elapsed time $T_n$ calculated at step 103. Then, at step 107, the final difference $\Delta T_n$ is calculated by subtracting the estimated value $\alpha$ from the difference $\Delta T_n$. Next, at step 108, $\Delta TC_n (= [(T_n - T_{n-1}) - (T_{n-2} - T_{n-3})]$ used for discriminating the pattern of change of the elapsed time $T_n$ is calculated and the routine proceeds to step 109.

At step 109, it is determined whether the conditions for discrimination of a misfire are satisfied or not. For example, when the engine has been started and the air-conditioner is switched from OFF to ON and at a gear change of the automatic transmission, it is judged that the conditions for discrimination of a misfire are not satisfied and the routine proceeds to step 121. At other times, it is judged that the conditions for discrimination of a misfire are satisfied and the routine proceeds to step 110. At step 110, it is determined whether the elapsed time $\Delta T_{n-2}$ of the explosion stroke of the cylinder which had performed combustion two cylinders before has exceeded the set value $K_1$. When $\Delta T_{n-2} \leq K_1$, the routine jumps to step 121, while when $\Delta T_{n-2} \leq K_1$, the routine proceeds to step 111.

From step 111 to step 113, it is determined whether the pattern of change of the elapsed time $\Delta T_n$ is the pattern of change of the time of a misfire. That is, first, at step 111, it is determined whether $\Delta TC_{n-2}$ is larger than $K_2 \cdot |\Delta TC_{n-3}|$ (where $K_2$ is a constant). When $\Delta TC_{n-2} \leq K_2 \cdot |\Delta TC_{n-3}|$, the routine jumps to step 121, while when $\Delta TC_{n-2} > K_2 \cdot |\Delta TC_{n-3}|$, the routine proceeds to step 112. At step 112, it is determined whether $\Delta TC_{n-2}$ is larger than $K_3 \cdot |\Delta TC_{n-1}|$ (where $K_3$ is a constant). When $\Delta TC_{n-2} \leq K_3 \cdot |\Delta TC_{n-1}|$, the routine jumps to step 121, while when $\Delta TC_{n-2} > K_3 \cdot |\Delta TC_{n-1}|$, the routine proceeds to step 113. At step 113, it is determined whether $\Delta TC_{n-2}$ is larger than $K_4 \cdot |\Delta TC_n|$ (where $K_4$ is a constant). When $\Delta TC_{n-2} \geq K_4 \cdot |\Delta TC_n|$, the routine jumps to step 121, while when $\Delta TC_{n-2} > K_4 \cdot |\Delta TC_n|$, the routine proceeds to step 114. That is, when the pattern of change of the elapsed time $T_n$ is the pattern of change of the time of a misfire, the routine proceeds to step 114.

At step 114, it is determined whether the count value n is 1. When n=1, the routine proceeds to step 115, where a #1 abnormality flag is set showing that the #1 cylinder is misfiring, then the routine proceeds to step 121. When n is not equal to 1, the routine proceeds to step 116, where it is determined whether the count value n is 2. When n=2, the routine proceeds to step 117, where the #3 abnormality flag is set showing that the #3 cylinder is misfiring and then the routine proceeds to step 121. When n is not equal to 2, the routine proceeds to step 118, where it is determined whether the count value n is 3. When n=3, the routine proceeds to step 119, where a #4 abnormality flag is set showing that the #4 cylinder is misfiring, then the routine proceeds to step 121. When n is not equal to 3, the routine proceeds to step 120, where the #2 abnormality flag is set showing that the #2 cylinder is misfiring, then the routine proceeds to step 121. At step 121, the misfiring cylinder number is stored in accordance with the abnormality flag which has been set and an alarm lamp 30 is lit.

In this way, by judging that a misfire has occurred when the difference $\Delta T$ has become larger than the set value $K_1$ and further the pattern of change of the elapsed time T has become the pattern of change of the time of a misfire, it is possible to judge with a good reliability that a misfire has actually occurred. However, when the vehicle is being driven over a hilly road, sometimes the pattern of change of the elapsed time T becomes the pattern of change of the time of a misfire despite the fact that no misfire has occurred. Accordingly, if it is judged that a misfire has occurred whenever the difference $\Delta T$ becomes greater than the set value $K_1$ and the pattern of change of the elapsed time T becomes the pattern of change of the time of a misfire, then sometimes an erroneous judgement will be made.

When a vehicle is actually driven over a hilly road, the difference $\Delta T$ will frequently exceed the set value $K_1$. However, during this time, the pattern of change of the elapsed time T will not often resemble the pattern of change of the time of a misfire. As opposed to this, when a misfire has occurred, the difference $\Delta T$ will definitely exceed the set value $K_1$ and the pattern of change of the elapsed time T will definitely become the pattern of change of the time of a misfire. Accordingly, when the difference $\Delta T$ has exceeded the set value $K_1$, if the pattern of change of the elapsed time T becomes the pattern of change of time of a misfire for less than a certain percentage of the time, then it may be judged that no misfire has occurred and that the vehicle is driving over a hilly road and that this is the cause of the pattern of change of the elapsed time T to sometimes becoming the pattern of change of the time of a misfire. If this is done, it becomes possible to more accurately detect the occurrence of a misfire. This is the method of detecting misfiring in the second embodiment of the present invention.

In this way, in the second embodiment, it is judged that no misfire has occurred even if the difference $\Delta T$ has exceeded the set value $K_1$ if the pattern of change of the elapsed time T does not become the pattern of change of the time of a misfire for more than a certain percentage of time. In this case, there is the possibility that a misfire is actually occurring in this case even if the pattern of change of the elapsed time T does not become the pattern of change of the time of a misfire for more than a certain percentage of time due to reasons other than the vehicle driving over a hilly road. Accordingly, in the second embodiment, to more accurately detect a misfire, it is necessary to find the percentage of time when the pattern of change of the elapsed time T does not become the pattern of change of the time of a misfire out of the times when the difference $\Delta T$ exceeds the set value $K_1$ when driving over a hilly road. When the difference $\Delta T$ exceeds the set value $K_1$ despite the fact that the vehicle is not driving over a hilly road except at the time of a misfire, it is necessary therefore to exclude this from the number of times when the difference $\Delta T$ has exceeded the set value $K_1$.

As a case where the difference $\Delta T$ will exceed the set value $K_1$ despite no misfire occurring and the vehicle not being driven on a hilly road, there is the case of fluctuation of the engine rotational speed N just after the occurrence of a misfire in counter-reaction to the same. Accordingly in the second embodiment according to the present invention, when the difference $\Delta T$ exceeds the set value $K_1$ due to fluctuation of the engine rotational speed N in this case, this is excluded from the number of times the difference $\Delta T$ has exceeded the set value $K_1$. Next, this will be explained with reference to FIG. 10 and FIG. 11.

Figure 10:
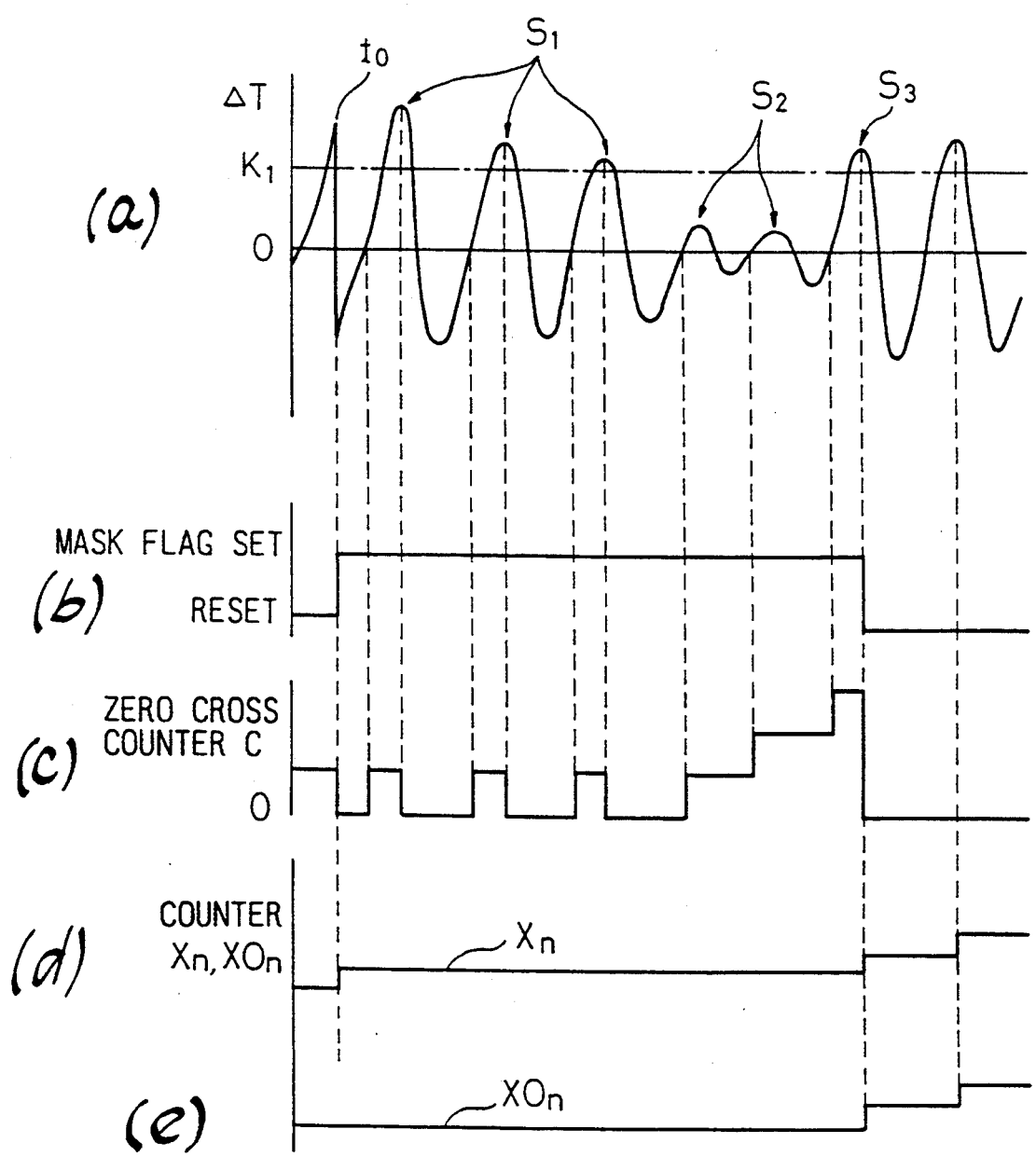
FIG. 10 is a time chart of the operation of a mask flag and a zero cross counter.

If a misfire occurs at the time $t_0$ of FIG. 10 and as a result the difference $\Delta T$ exceeds the set value $K_1$, then, particularly during a low speed and high load operation of the engine, the difference $\Delta T$ will exceed the set value $K_1$ several times as shown by $S_1$ in FIG. 10 in counter-reaction to the same. The difference $\Delta T$ exceeds the set value $K_1$ in this way not due to a misfire occurring and also not due to driving over a hilly road, so when the difference $\Delta T$ exceeds the set value $K_1$ as shown by $S_1$, it is necessary to exclude that from the number of times the difference $\Delta T$ has exceeded the set value $K_1$. Therefore, in the second embodiment of the present invention, use is made of a mask flag and a zero cross counter C as shown in FIG. 10.

This zero cross counter C counts up when the difference $\Delta T$ changes from negative to positive. When the difference $\Delta T$ becomes the maximum value, in the actual routine, when the difference $\Delta T$ becomes larger than the set value $K_1$, the counter C is reset. As opposed to this, the mask flag is set when it is judged that a misfire has occurred and is reset when the difference $\Delta T$ exceeds the set value $K_1$ and the count value of the zero cross counter C is 2 or more. Further, while the mask flag is set, a count action by the counter $X_n$ for counting the number of times that a misfire has occurred and a count action by the counter $XO_n$ for counting the number of times that the difference $\Delta T$ has exceeded the set value $K_1$, but the pattern of change of the elapsed time T has not become the pattern of change of the time of a misfire are prohibited.

If such a mask flag and zero cross counter C are used, then even if the difference $\Delta T$ exceeds the set value $K_1$ as a counter-reaction to a misfire as shown by $S_1$ in FIG. 10, the zero cross counter C will repeat "0" and "1" and therefore the mask flag will continue to be set and the count action of the counters $X_n$ and $XO_n$ will not be performed. If the fluctuation of engine rotational speed N occurring as a counter-reaction to a misfire dies down, the difference $\Delta T$ repeatedly becomes positive and negative as shown by $S_2$ in FIG. 10, therefore during this time, the count value of the zero cross counter C becomes 2 or more. Therefore, when the difference $\Delta T$ at $S_3$ of FIG. 10 exceeds the set value $K_1$, the mask flag is reset and the count action by the counter $X_n$ is started.

Figure 11:
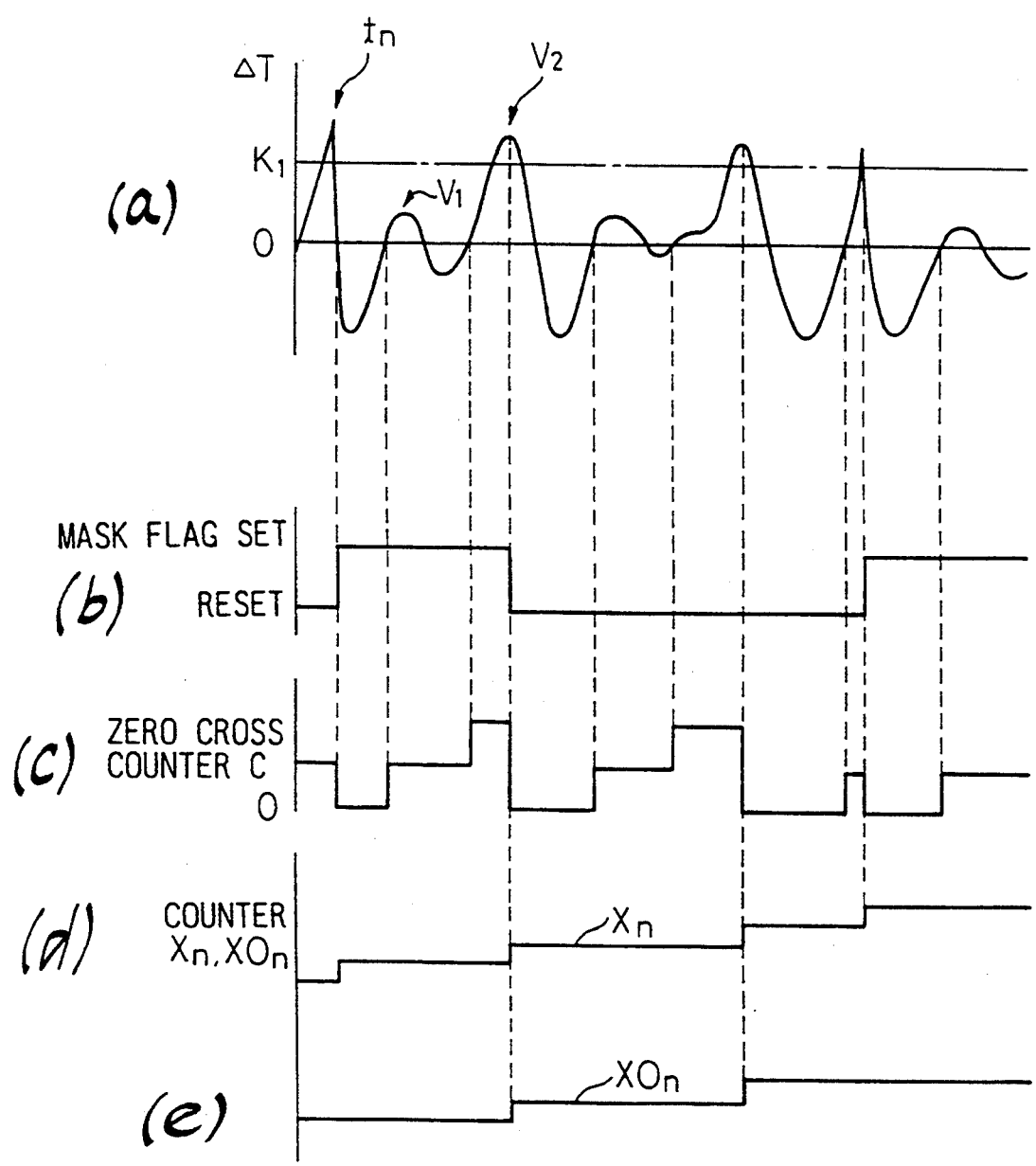
FIG. 11 is a time chart of the operation of a mask flag and a zero cross counter.
Figure 12A:
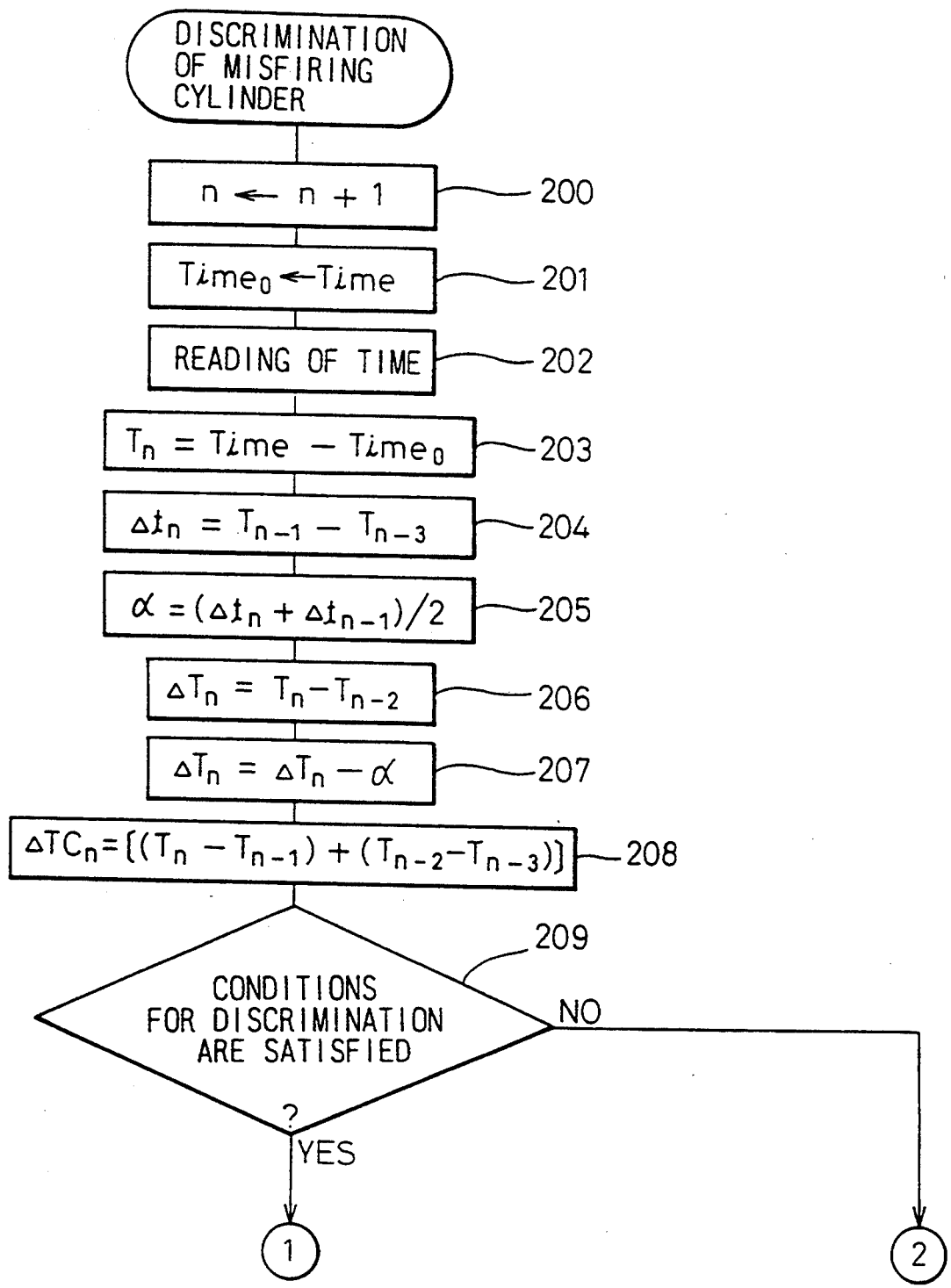
FIGS. 12A, 12B, 12C, and 12D are flow charts of a second embodiment for discrimination of a misfiring cylinder.
Figure 12B:
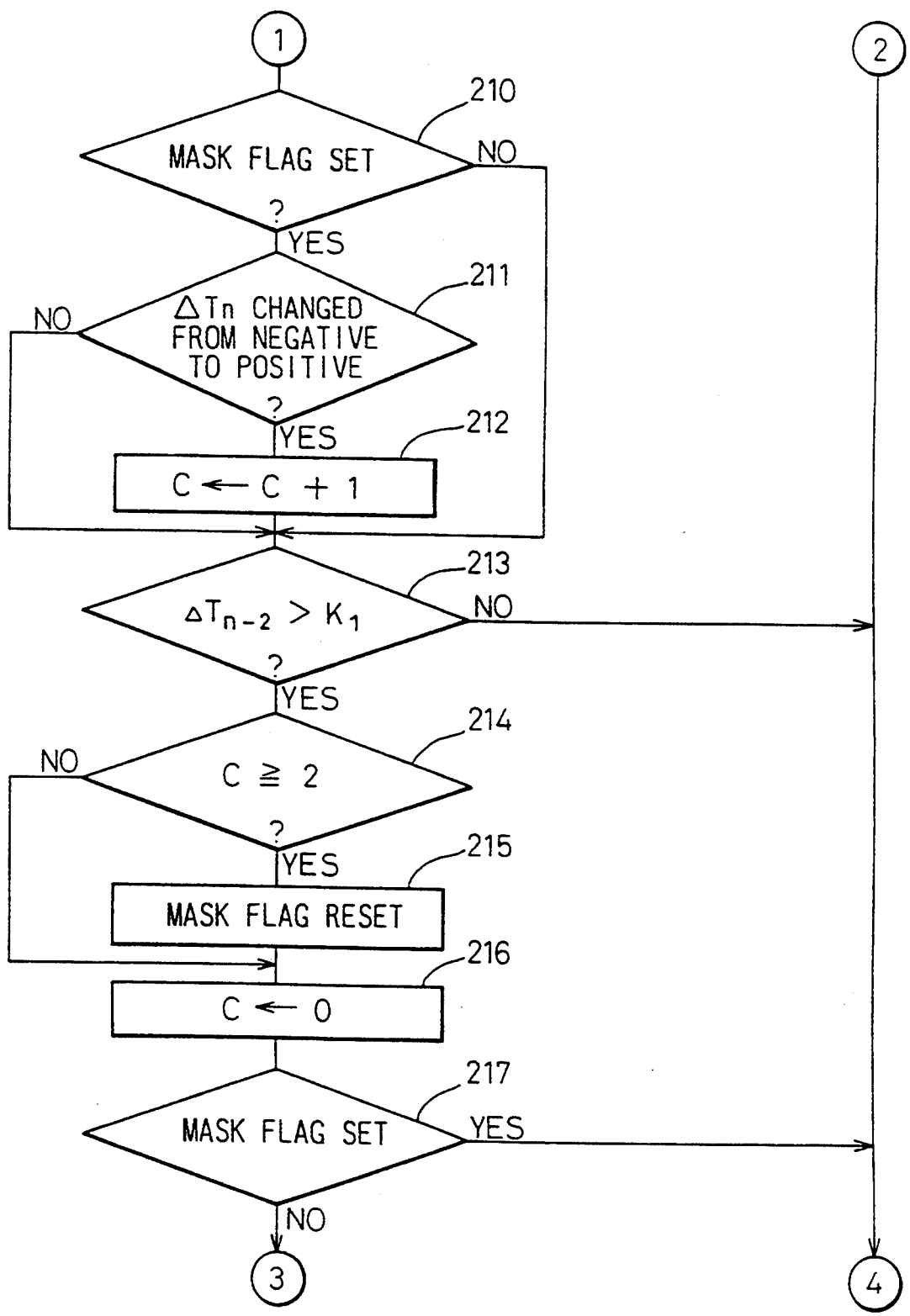
Figure 12C:
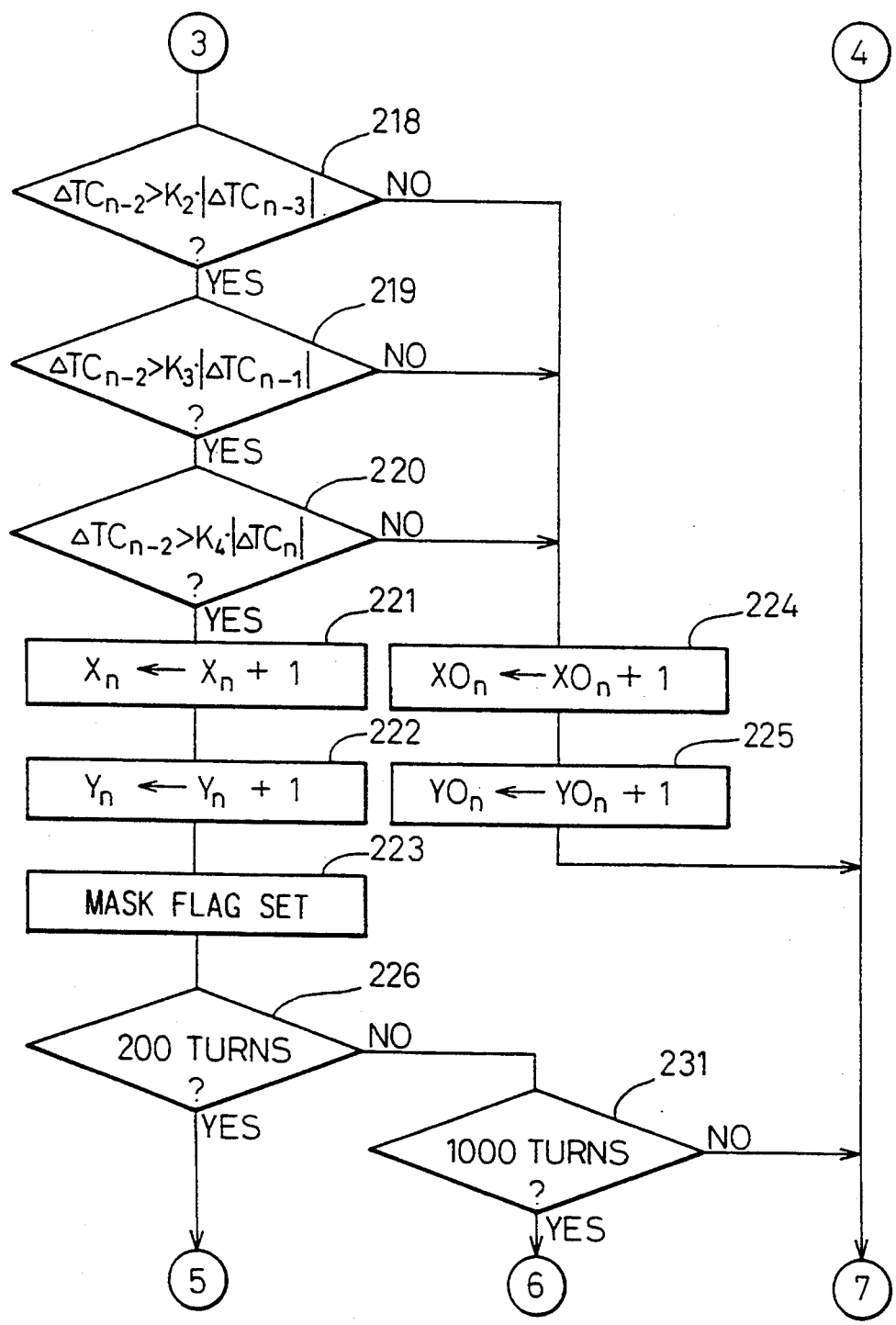
Figure 12D:
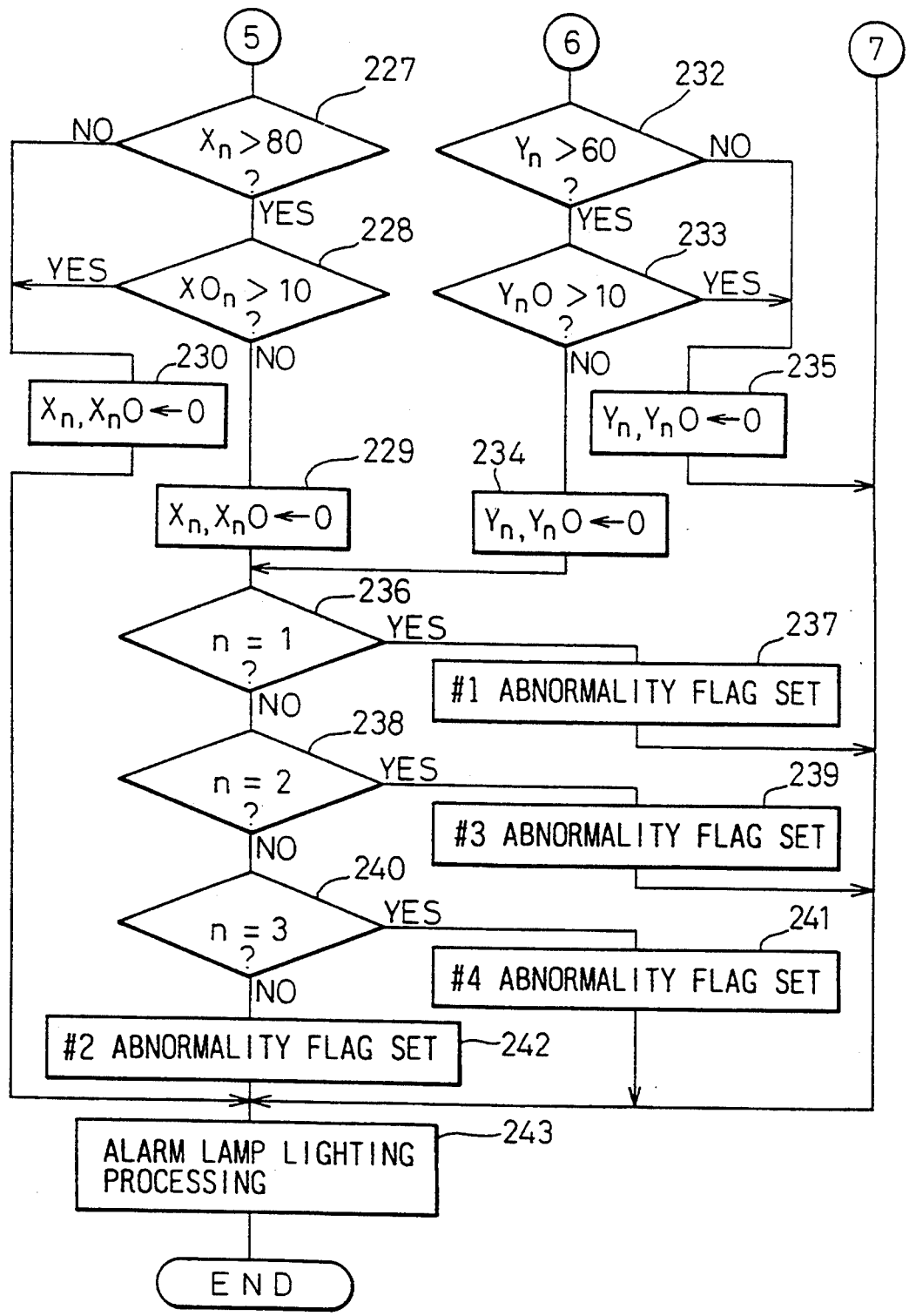

On the other hand, FIG. 11 shows the case where the engine rotational speed does not fluctuate that much as a counter-reaction to a misfire. In this case, even if a misfire occurs at $t_n$, the difference $\Delta T$ does not exceed the set value $K_1$ and a simple change between positive and negative is repeated. Accordingly, during this time, if the count value of the zero cross counter C becomes 2 or more and therefore the difference $\Delta T$ at $V_2$ exceeds the set value $K_1$, the mask flag is reset and therefore the count action of the counter $X_n$ is performed. By using the zero cross counter C in this way, it becomes possible to prevent the counter $X_n$ from counting when the difference $\Delta T$ exceeds the set value $K_1$ due to a counter-reaction to a misfire.

In FIG. 11, the counter $X_n$ is provided for counting the number of times that the difference $\Delta T$ exceeds the set value $K_1$ and the pattern of change of the elapsed time T becomes the pattern of change of the time of a misfire due to the occurrence of a misfire or driving on a hilly road, while the counter $XO_n$ is provided for counting the number of times the difference $\Delta T$ exceeds the set value $K_1$, but the pattern of change of the elapsed time T does not become the pattern of change at the time of a misfire. In the second embodiment of the present invention, when the engine has rotated 200 turns and the count value of the counter $X_n$ has become over 80, for example, and the count value of the counter $XO_n$ has become less than 10, for example, it is judged that misfiring is occurring at a frequency causing deterioration of the exhaust gas purification catalyst, the number of the corresponding cylinder is stored, and the alarm lamp 30 is lit.

Further, in the second embodiment of the present invention, provision is made of a separate pair of counters $Y_n$ and $YO_n$ for discriminating if a misfire has occurred at a frequency causing deterioration of the exhaust emission, i.e., a counter $Y_n$ for counting the number of times the difference $\Delta T$ has exceeded the set value $K_1$ and further the pattern of change of the elapsed time T has become the pattern of change of the time of a misfire due to the occurrence of a misfire or driving on a hilly road and the counter $YO_n$ for counting the number of times the difference $\Delta T$ has exceeded the set value $K_1$ but the pattern of change of the elapsed time T has not become the pattern of change of the time of a misfire. In the second embodiment of the present invention, when the engine has rotated 1000 turns and the count value of the counter $Y_n$ has become over 60, for example, and the count value of the counter $YO_n$ has become less than 10, for example, it is judged that a misfire is occurring at a frequency causing deterioration of the exhaust emission, the number of the corresponding cylinder is stored, and the alarm lamp 30 is lit.

FIGS. 12A, 12B, 12C, and 12D show a routine for executing the second embodiment of the method of detecting a misfire. The routine is executed by an interruption routine every 180 degrees. Note that in this routine, it is discriminated whether there is a misfire in the cylinder ($\Delta T_{n-2}$) which performed the combustion two cylinders before the one with a difference of $\Delta T_n$ when calculating the $\Delta T_n$.

Referring to FIGS. 12A, 12B, 12C, and 12D, first, at step 200, the count value n is incremented by one. Then, at step 201, the time TIME is made $TIME_0$. Next, at step 202, the current time TIME counted by the timer 25 is read in. Accordingly, the $TIME_0$ at step 201 expresses the time at the previous interruption. Next, at step 203, the elapsed time $T_n$ is calculated by subtracting the time $TIME_0$ at the previous interruption from the current time TIME. Next, at step 204, the difference $\Delta t_n$ ($=T_{n-1}-T_{n-3}$) for finding the estimated value $\alpha$ is calculated. Next, at step 206, the difference $\Delta T_n$ of the elapsed time is calculated by subtracting the elapsed time $T_{n-2}$ calculated at the time of the interruption two interruptions ago from the elapsed time $T_n$ calculated at step 203. Then, at step 207, the final difference $\Delta T_n$ is calculated by subtracting the estimated value $\alpha$ from the difference $\Delta T_n$. Next, at step 208, $\Delta TC_n$ ($=[(T_n-T_{n-1})-(T_{n-2}-T_{n-3})]$) used for discriminating the pattern of change of the elapsed time $T_n$ is calculated and the routine proceeds to step 209.

At step 209, it is discriminated if the conditions for discrimination of a misfire are satisfied or not. For example, when the engine has been started and the air-conditioner is switched from OFF to ON and at a gear change of the automatic transmission, it is judged that the conditions for discrimination of a misfire are not satisfied and the routine proceeds to step 243. At other times, it is judged that the conditions for discrimination of a misfire are satisfied and the routine proceeds to step 210. From step 210 to step 217, the control of the mask flag and zero cross counter C mentioned earlier is performed. That is, first, at step 210, it is discriminated if the mask flag has been set. If the mask flag has not been set, the routine jumps to step 213, while if the mask flag has been set, the routine proceeds to step 211. At step 211, it is discriminated if the difference $\Delta T_n$ has changed from negative to positive. When the difference $\Delta T_n$ has not changed from negative to positive, the routine jumps to step 213, while when the difference $\Delta T_n$ has changed from negative to positive, the count value of the zero cross counter C is incremented by one. Next, the routine proceeds to step 213. Accordingly, when the mask flag has been set, the count value of the zero cross counter C is incremented by one each time the difference $\Delta T_n$ changes from negative to positive.

At step 213, it is discriminated if the elapsed time $\Delta T_{n-2}$ of the explosion stroke of the cylinder which had performed combustion two cylinders before has exceeded the set value $K_1$. When $\Delta T_{n-2} \leq K_1$, the routine jumps to step 243, while when $\Delta T_{n-2} > K_1$, the routine proceeds to step 214. At step 214, it is discriminated if the count value C of the zero cross counter is 2 or more. When C>2, the routine proceeds to step 216, while when C≧2, the routine proceeds to step 215, where the mask flag is reset, then the routine proceeds to step 216. At step 216, the count value of the zero cross counter C is made zero, then the routine proceeds to step 217, where it is discriminated if the mask flag has been set. When the mask flag has been set, the routine jumps to step 218, while when the mask flag has not been set, the routine proceeds to step 218. Therefore, only when $\Delta T_{n-2} > K_1$ and the mask flag has been not set, the routine proceeds to step 218.

From step 218 to step 220, it is discriminated if the pattern of change of the elapsed time $\Delta T_n$ is the pattern of change of the time of a misfire. That is, first, at step 218, it is discriminated if $\Delta TC_{n-2}$ is larger than $K_2 \cdot |\Delta TC_{n-3}|$ (where $K_2$ is a constant). When $\Delta TC_{n-2} \leq K_2 \cdot |\Delta TC_{n-3}|$, the routine proceeds to step 224, while when $\Delta TC_{n-2} > K_2 \cdot |\Delta TC_{n-3}|$, the routine proceeds to step 219. At step 219, it is discriminated if $\Delta TC_{n-2}$ is larger than $K_3 \cdot |\Delta TC_{n-1}|$ (where $K_3$ is a constant). When $\Delta TC_{n-2} \leq K_3 \cdot |\Delta TC_{n-1}|$, the routine proceeds to step 224, while when $\Delta TC_{n-2} > K_3 \cdot |\Delta TC_{n-1}|$, the routine proceeds to step 220. At step 220, it is discriminated if $\Delta TC_{n-2}$ is larger than $K_4 \cdot |\Delta TC_n|$ (where $K_4$ is a constant). When $\Delta TC_{n-2} \geq K_4 \cdot |\Delta TC_n|$, the routine proceeds to step 224, while when $\Delta TC_{n-2} < K_4 \cdot |\Delta TC_n|$, the routine proceeds to step 221. That is, the routine proceeds to step 221 when the pattern of change of the elapsed time T is the pattern of change of the time of a misfire.

At step 221, the count value of the counter $X_n$ is incremented by one, then at step 222, the count value of the counter $Y_n$ is incremented by one. Next, at step 223, the mask flag is set, then the routine proceeds to step 226. Therefore, it is learned, the mask flag is set each time $\Delta K_{n-2}$ becomes larger than $K_1$ and the pattern of change of the elapsed time T becomes the pattern of the time of a misfire. On the other hand, at step 224, the count value of the counter $XO_n$ is incremented by one, then at step 225, the count value of the counter $YO_n$ is incremented by one. Accordingly, when $\Delta K_{n-2}$ is greater than $K_1$, but the pattern of change of the elapsed time T is not the pattern of change of the time of a misfire, the count values of the counters $XO_n$ and $YO_n$ are incremented by one.

At step 226, it is discriminated if the engine has rotated 200 times. When the engine has rotated 200 times, the routine proceeds to step 227, where it is discriminated if the count value of the counter $X_n$ set for each cylinder is larger than 80. When $X_n > 80$, the routine proceeds to step 228, where it is discriminated if the count value of the counter $XO_n$ set for each cylinder is larger than 10. When $XO_n \leq 10$, the routine proceeds to step 229, where the count values of the counters $X_n$ and $XO_n$ are made zero. Next, the routine proceeds to step 236. Accordingly, the routine proceeds to step 236 when the number of times $X_n$ it has been judged that a misfire has occurred is more than 80 and the frequency by which the pattern of change of the elapsed time T not becoming the pattern of change of the time of a misfire is less than a certain percentage. Note that when it is judged that $X_n \leq 80$ at step 227 or it is judged that $XO_n > 10$ at step 228, the routine proceeds to step 230, where the count values of the counters $X_n$ and $X_nO$ are made zero, then the routine proceeds to step 243. The processing from step 227 to step 230 is executed each time the engine rotates 200 turns.

On the other hand, if it is judged at step 226 that the engine has not rotated 200 times, then the routine proceeds to step 231, where it is discriminated if the engine has rotated 1000 times. When it is judged that the engine has not rotated 1000 times, the routine jumps to step 243. As opposed to this, when the engine has rotated 1000 times, the routine proceeds to step 232, where it is discriminated if the count value of the counter $Y_n$ provided for each cylinder is larger than 60. When $Y_n > 60$, the routine proceeds to step 233, where it is discriminated if the count value of the counter $YO_n$ provided for each cylinder is larger than 10. When $YO_n \leq 10$, the routine proceeds to step 234, where the count values of the counters $Y_n$ and $YO_n$ are made zero. Next, the routine proceeds to step 236. Accordingly, the routine proceeds to step 236 when the number of times $Y_n$ that a misfire has judged to have occurred is more than 60 and the frequency by which the pattern of change of the elapsed time T has not become the pattern of change of the time of a misfire during that is less than a certain percentage. Note that when it is judged at step 232 that $Y_n \leq 60$ or at step 233 that $YO_n > 10$, the routine proceeds to step 234, where the count values of the counters $Y_n$ and $YO_n$ are made zero, then the routine proceeds to step 243. The processing from step 232 to 235 is executed each time the engine rotates 1000 turns.

At step 236, it is discriminated if the count value n is 1. When n=1, the routine proceeds to step 237, where the #1 abnormality flag is set showing that the #1 cylinder is misfiring, then the routine proceeds to step 243. When n is not equal to 1, the routine proceeds to step 238, where it is discriminated if the count value n is 2. When n=2, the routine proceeds to step 239, where the #3 abnormality flag is set showing that the #3 cylinder is misfiring, then the routine proceeds to step 243. When n is not equal to 2, the routine proceeds to step 240, where it is discriminated if the count value n is 3. When n=3, the routine proceeds to step 241, where the #4 abnormality flag is set showing that the #4 cylinder is misfiring, then the routine proceeds to step 243. When n is not equal to 3, the routine proceeds to step 242, where the #2 abnormality flag is set showing that the #2 cylinder is misfiring, then the routine proceeds to step 243. At step 243, the misfiring cylinder number is stored corresponding to the abnormality flag which has been set and the alarm lamp 30 is lit.

FIG. 13 to FIG. 17C show a third embodiment of application of the present invention to a V-type eight-cylinder internal combustion engine.

Figure 13:
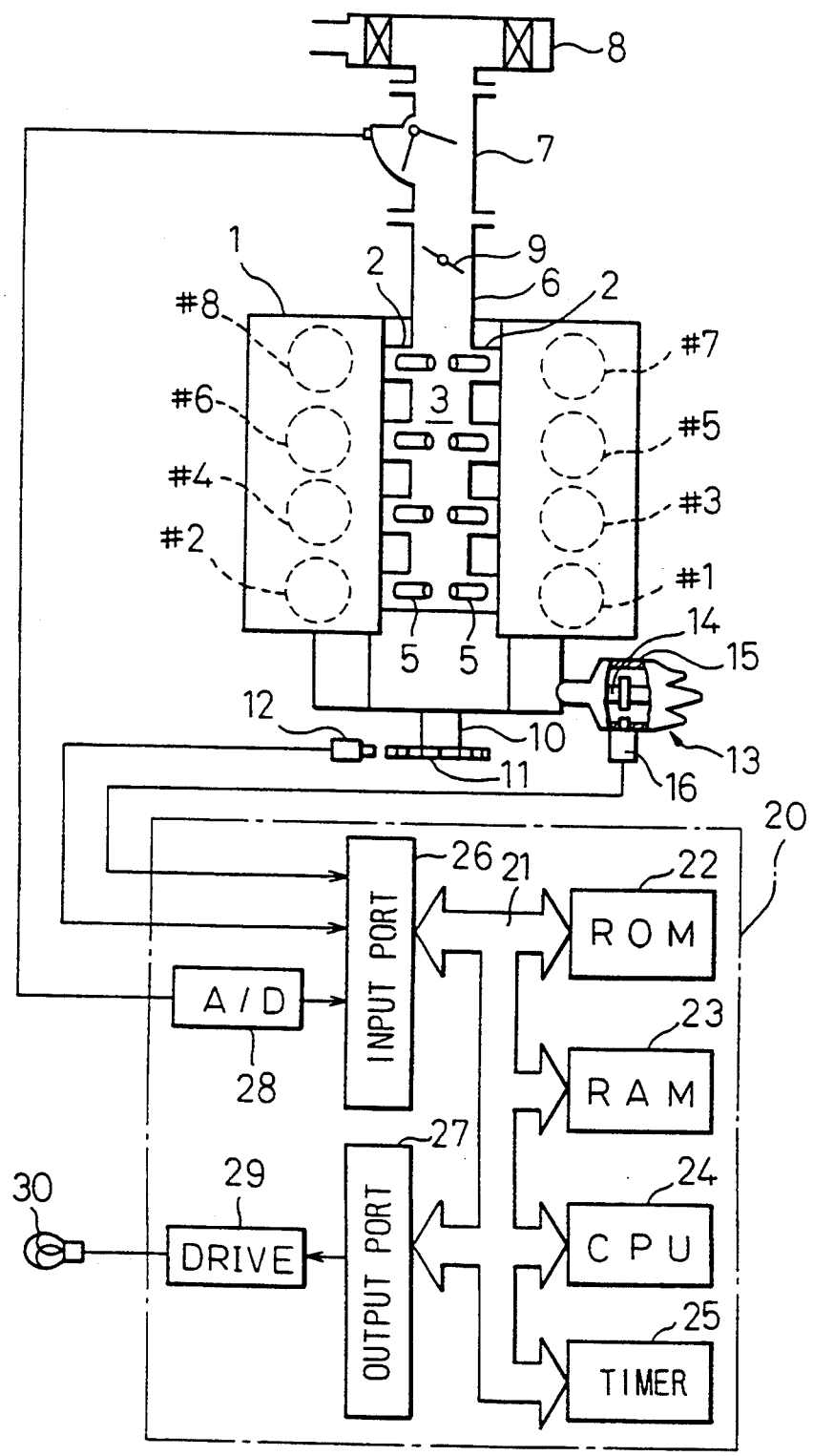
FIG. 13 is an overall view of a V8 internal combustion engine.

FIG. 13 is an overall view of a V-type eight-cylinder internal combustion engine. In FIG. 13, constituent elements similar to those in FIG. 1 are given the same references. Referring to FIG. 13, the internal combustion engine is provided with eight cylinders: the #1 cylinder, #2 cylinder, #3 cylinder, #4 cylinder, #5 cylinder, #6 cylinder, #7 cylinder, and #8 cylinder. Further, the output port 27 is connected through a corresponding drive circuit 29 to an alarm lamp 30 showing which of the cylinders of the #1 cylinder to #8 cylinder has misfired. Note that the ignition order in this V-type eight-cylinder engine is 1-8-4-3-6-5-7-2.

Figure 14:
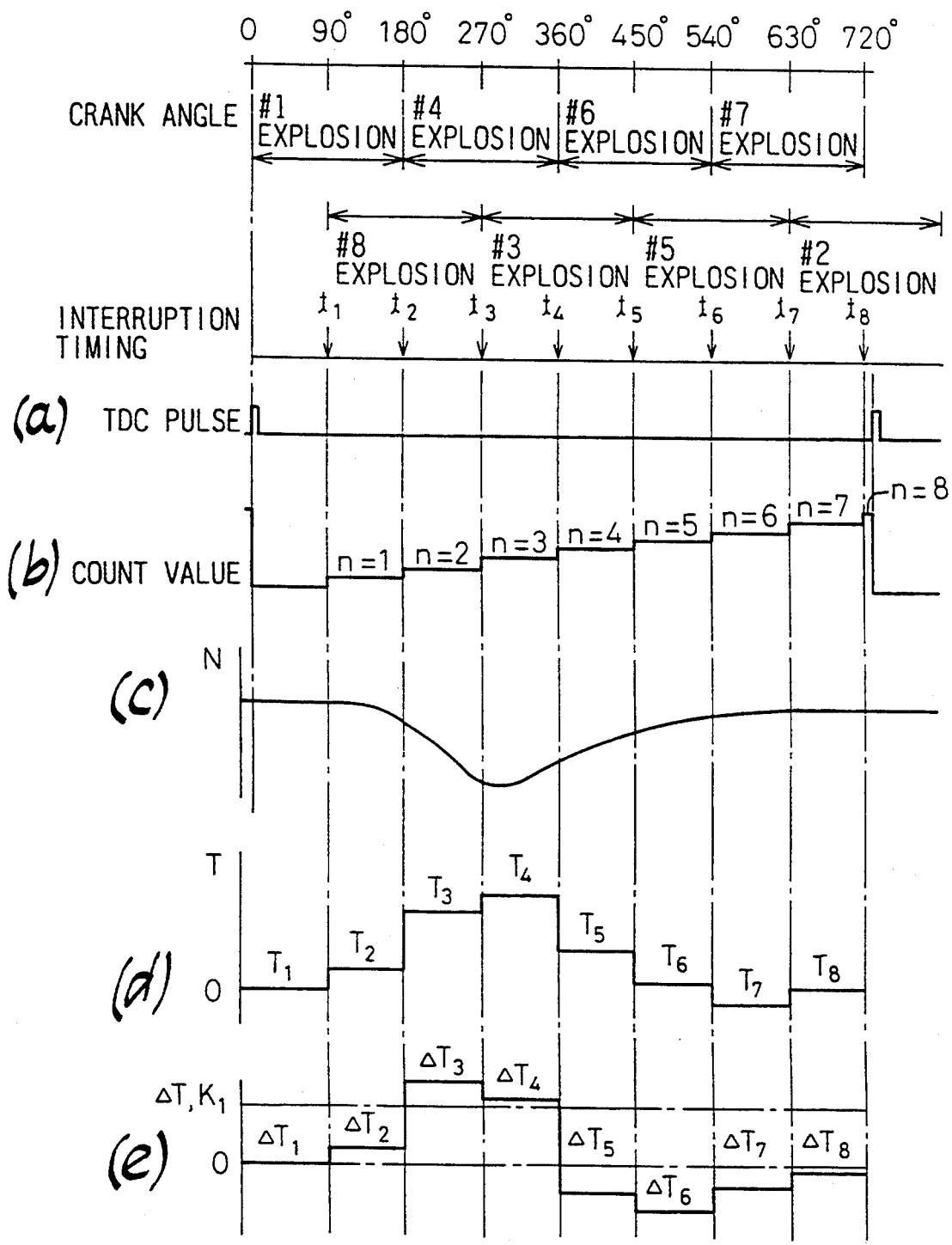
FIG. 14 is a time chart of a specific example of a method of detection of a misfire in a V8 internal combustion engine.

FIG. 14 shows the method of detecting a misfire in a V-type eight-cylinder internal combustion engine. FIG. 14 shows the case where a misfire has occurred in the #8 cylinder. Note that in FIG. 14, $T_1$ shows the elapsed time required for the crankshaft 10 to rotate by 90 degrees crank angle in the first half of the time of combustion of the #1 cylinder. Similarly, $T_2$ shows the elapsed time in the first half of the combustion stroke of the #8 cylinder, $T_3$ shows the elapsed time in the first half of the combustion stroke of the #4 cylinder, $T_4$ shows the elapsed time in the first half of the combustion stroke of the #3 cylinder, $T_5$ shows the elapsed time in the first half of the combustion stroke of the #6 cylinder, $T_6$ shows the elapsed time in the first half of the combustion stroke of the #5 cylinder, $T_7$ shows the elapsed time in the first half of the combustion stroke of the #7 cylinder, and $T_8$ shows the elapsed time in the first half of the combustion stroke of the #2 cylinder.

As shown in FIG. 14, if a misfire occurs in the #8 cylinder, the drive force given to the engine during the explosion stroke of the #8 cylinder, that is, over about 180 degrees crank angle, falls, so while the crankshaft 10 is rotating over 180 degrees crank angle, the engine rotational speed N continues to fall. Accordingly, when a misfire occurs in the #8 cylinder, it means that the engine rotational speed N falls the most in the first half of the combustion stroke of the #3 cylinder after 180 degrees crank angle from that time. Therefore, if it is assumed that a misfire has occurred in the #8 cylinder, then the elapsed time $T_2$ in the first half of the combustion stroke of the #8 cylinder increases somewhat, the elapsed time $T_3$ in the first half of the combustion stroke of the #4 cylinder increases tremendously, the elapsed time $T_4$ in the first half of the combustion stroke of the #3 cylinder following that increases further, and then the elapsed times gradually fall.

On the other hand, $\Delta T$ shows the value obtained by subtracting the estimated value $\alpha$ from the difference of the elapsed time of the first half of the combustion stroke one stroke away. In an eight-cylinder internal combustion engine, the estimated value $\alpha$ is expressed by the following equation:

$$\Delta t_n = T_{n\text{-}2} - T_{n\text{-}6}$$

$$\alpha = (\Delta t_n + \Delta t_{n\text{-}1} + \Delta t_{n\text{-}2} + \Delta t_{n\text{-}3})/4$$

Here, n shows the cylinder in the combustion stroke when a misfire is judged to have occurred. In FIG. 14, this shows the #4 cylinder. On the other hand, (n-1) shows the cylinder which performed combustion before the cylinder in the combustion stroke when a misfire is judged to have occurred. Accordingly, (n-2) shows the #1 cylinder and (n-6) shows the #6 cylinder. The same follows. Therefore, $\Delta t_n (= T_{n\text{-}2} - T_{n\text{-}6})$ shows the difference in the elapsed time T in two cylinders with combustion strokes separated by 360 degrees crank angle from each other which have performed combustion before the cylinder which has misfired. The mean value of the difference when finding the difference for four sets of cylinders with combustion strokes separated by 360 degrees crank angle becomes $(\Delta t_n + \Delta t_{n\text{-}1} + \Delta t_{n\text{-}2} + \Delta t_{n\text{-}3})/4$. That is, if a deceleration operation is performed, the difference $\Delta T$ shifts by exactly the mean value per 360 degrees crank angle and therefore the estimated value $\alpha$ becomes as shown by the above equation.

As shown in FIG. 14, if the #1 cylinder reaches the explosion top dead center, the top dead center sensor 16 issues a top dead center pulse. When this top dead center pulse is issued, the count value n of the counter is made zero. On the other hand, the interruption routine is executed at each 90 degrees crank angle in the middle of the explosion strokes of the cylinders as shown by $t_1$, $t_2$, $t_3$, $t_4$, $t_5$, $t_6$, $t_7$, and $t_8$ in FIG. 14. When an interruption routine is executed, the count n of the counter is incremented by one and at the same time the elapsed times $T_1$, $T_2$, $T_3$, $T_4$, $T_5$, $T_6$, $T_7$, and $T_8$ from the previous interruption to the current interruption are calculated. That is, at the time of interruption shown by $t_1$, the elapsed time $T_1$ in the first half of the combustion stroke in the #1 cylinder is calculated, at the time of interruption shown by $t_2$, the elapsed time $T_2$ in the first half of the combustion stroke in the #8 cylinder is calculated, at the time of interruption shown by $t_3$, the elapsed time $T_3$ in the first half of the combustion stroke in the #4 cylinder is calculated, at the time of interruption shown by $t_4$, the elapsed time $T_4$ in the first half of the combustion stroke in the #3 cylinder is calculated, at the time of interruption shown by $t_5$, the elapsed time $T_5$ in the first half of the combustion stroke in the #6 cylinder is calculated, at the time of interruption shown by $t_6$, the elapsed time $T_6$ in the first half of the combustion stroke in the #5 cylinder is calculated, at the time of interruption shown by $t_7$, the elapsed time $T_7$ in the first half of the combustion stroke in the #7 cylinder is calculated, and at the time of interruption shown by $t_8$, the elapsed time $T_8$ in the first half of the combustion stroke in the #2 cylinder is calculated.

Further, at the time of interruptions, the difference $\Delta T$ of the elapsed time T in the first half of the combustion stroke two strokes away is calculated. That is, at the interruption shown by $t_1$, $\Delta T_1$ $(=T_1-T_7)$ is calculated, at the interruption shown by $t_2$, $\Delta T_2 (=T_2-T_8)$ is calculated, at the interruption shown by $t_3$, $\Delta T_3$ $(=T_3-T_1)$ is calculated, at the interruption shown by $t_4$, $\Delta T_4$ $(=T_4-T_2)$ is calculated, at the interruption shown by $t_5$, $\Delta T_5$ $(=T_5-T_3)$ is calculated, at the interruption shown by $t_6$, $\Delta T_6$ $(=T_6-T_4)$ is calculated, at the interruption shown by $t_7$, $\Delta T_7$ $(=T_7-T_5)$ is calculated, and at the interruption shown by $t_8$, $\Delta T_8$ $(=T_8-T_6)$ is calculated. Further, at each interruption, the estimated value $\alpha$ is subtracted from the difference $\Delta T$. The difference $\Delta T$ $(=\Delta T-\alpha)$ obtained by subtraction of the estimated value $\alpha$ is shown in FIG. 14. As will be understood from FIG. 14, in an eight-cylinder internal combustion engine, if a misfire occurs in the #8 cylinder, the difference $\Delta T_3$ in the #4 cylinder becomes maximum, therefore a misfire has occurred at the cylinder which had performed combustion one cylinder before the cylinder where the difference $\Delta T$ became maximum. In this case too, however, when the vehicle is driven over a hilly road, the difference $\Delta T$ sometimes will exceed the set value $K_1$ despite no misfire having occurred, and therefore in this case too, it is judged that a misfire has occurred when the pattern of change of the elapsed time T becomes the pattern of change of the time of a misfire.

However, in the four-cylinder internal combustion engine mentioned earlier, it is discriminated if the pattern of change of the elapsed time T is the pattern of change of the time of a misfire based on the following equation:

$$\Delta TC_n = [(T_n - T_{n-1}) - (T_{n-2} - T_{n-3})]$$

That is, in a four-cylinder internal combustion engine, the $\Delta TC_n$ is found from the difference of the differences $(T_n - T_{n-1})$ and $(T_{n-2} - T_{n-3})$ between adjoining cylinders separated by 360 degrees crank angle from each other. Accordingly, if this is applied to an eight-cylinder internal combustion engine, $\Delta TC_n$ becomes expressed as shown in the following equation:

$$\Delta TC_n = [(T_n - T_{n-1}) - (T_{n-4} - T_{n-5})]$$

If this $\Delta TC_n$ is used in an 8 cylinder internal combustion engine, however, it becomes impossible to detect accurately if the pattern of change of the elapsed time T becomes the pattern of change of the time of a misfire at the time of a high speed operation of the engine. The reasons for this will be explained below referring to FIG. 15.

Figure 15:
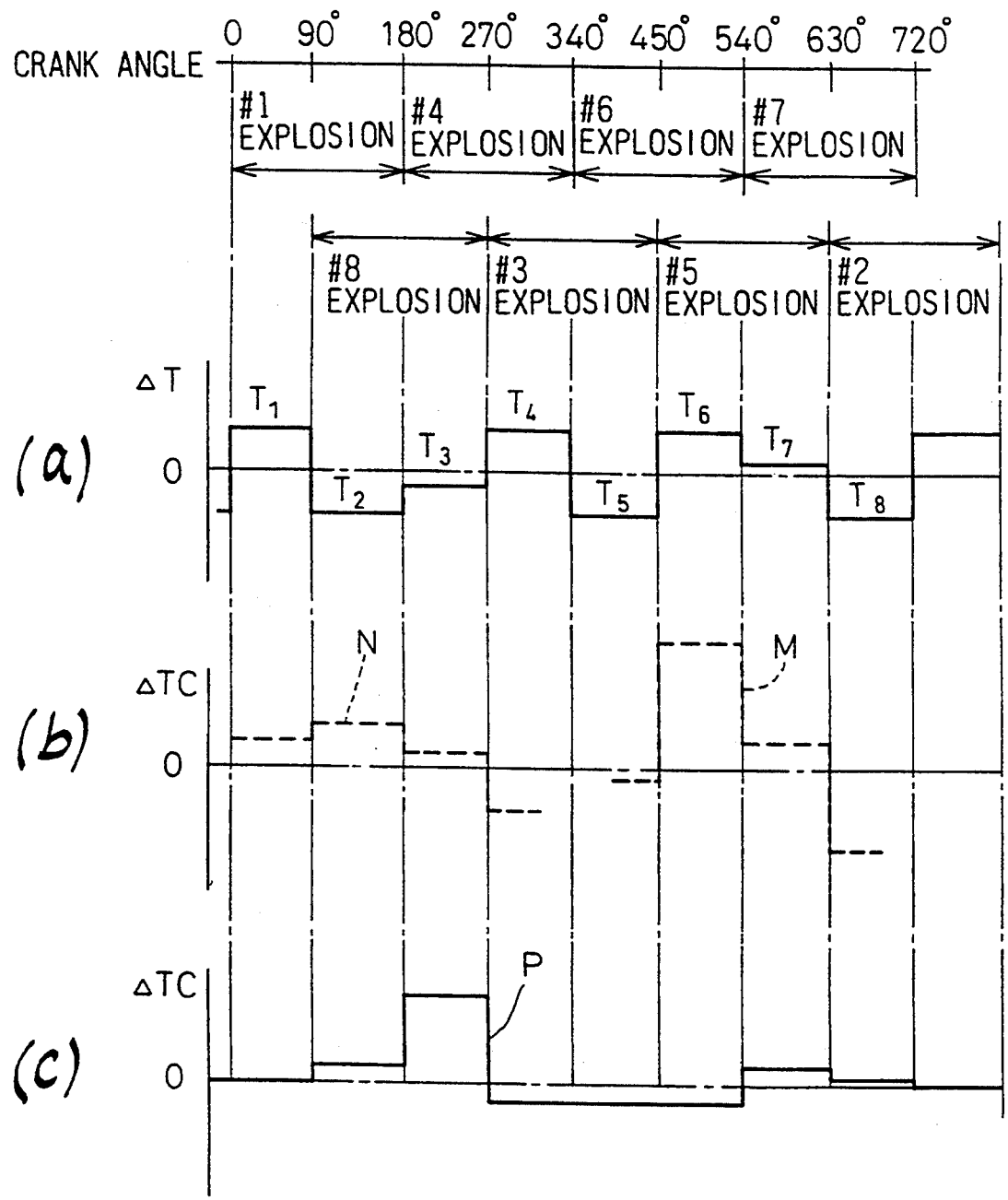
FIG. 15 is a time chart of the changes etc. in the ΔTC due to a misfire.
Figure 16A:
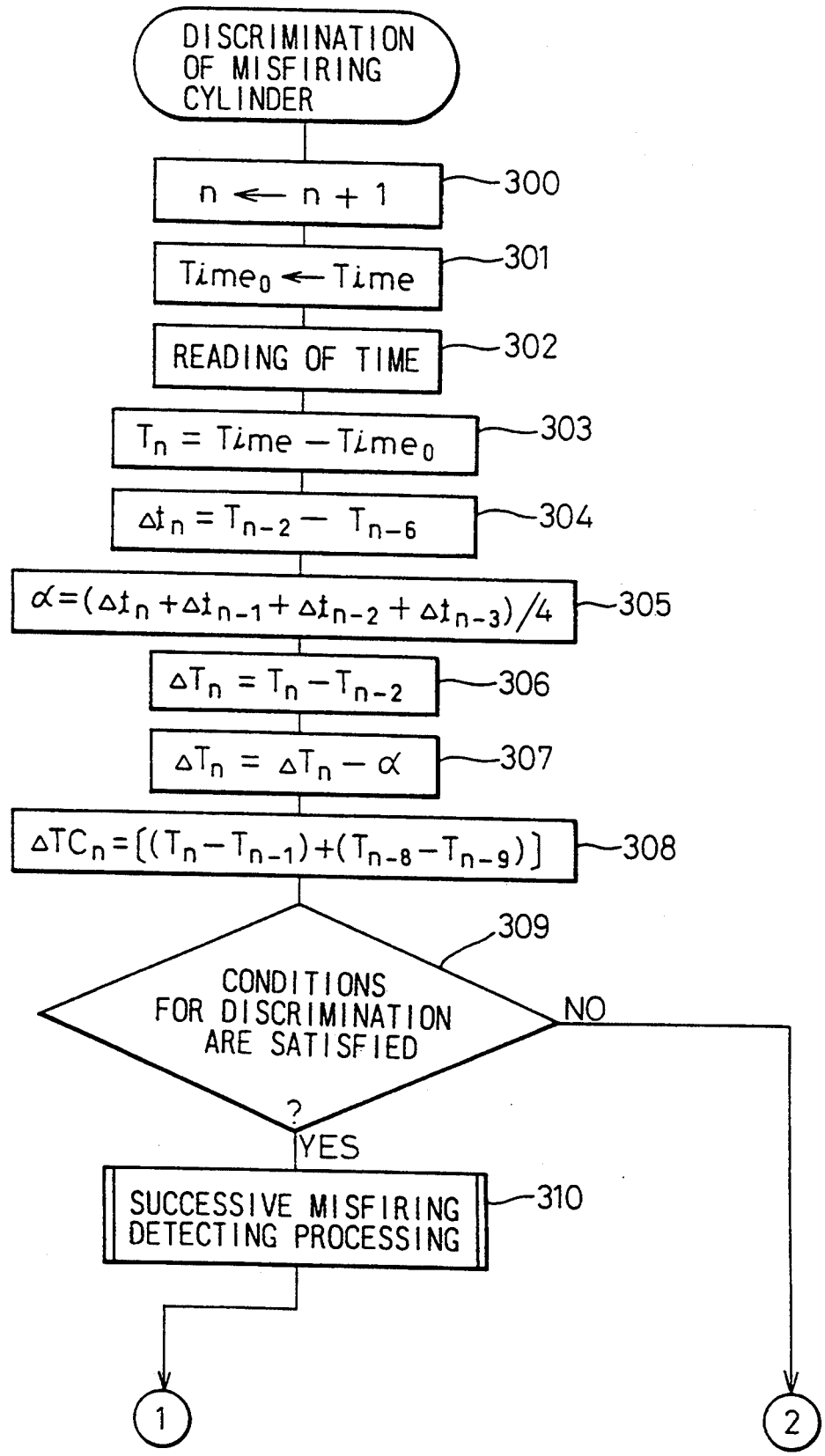
FIGS. 16A, 16B, 16C, 16D, and 16E are flow charts of a third embodiment for discrimination of a misfiring cylinder.
Figure 16B:
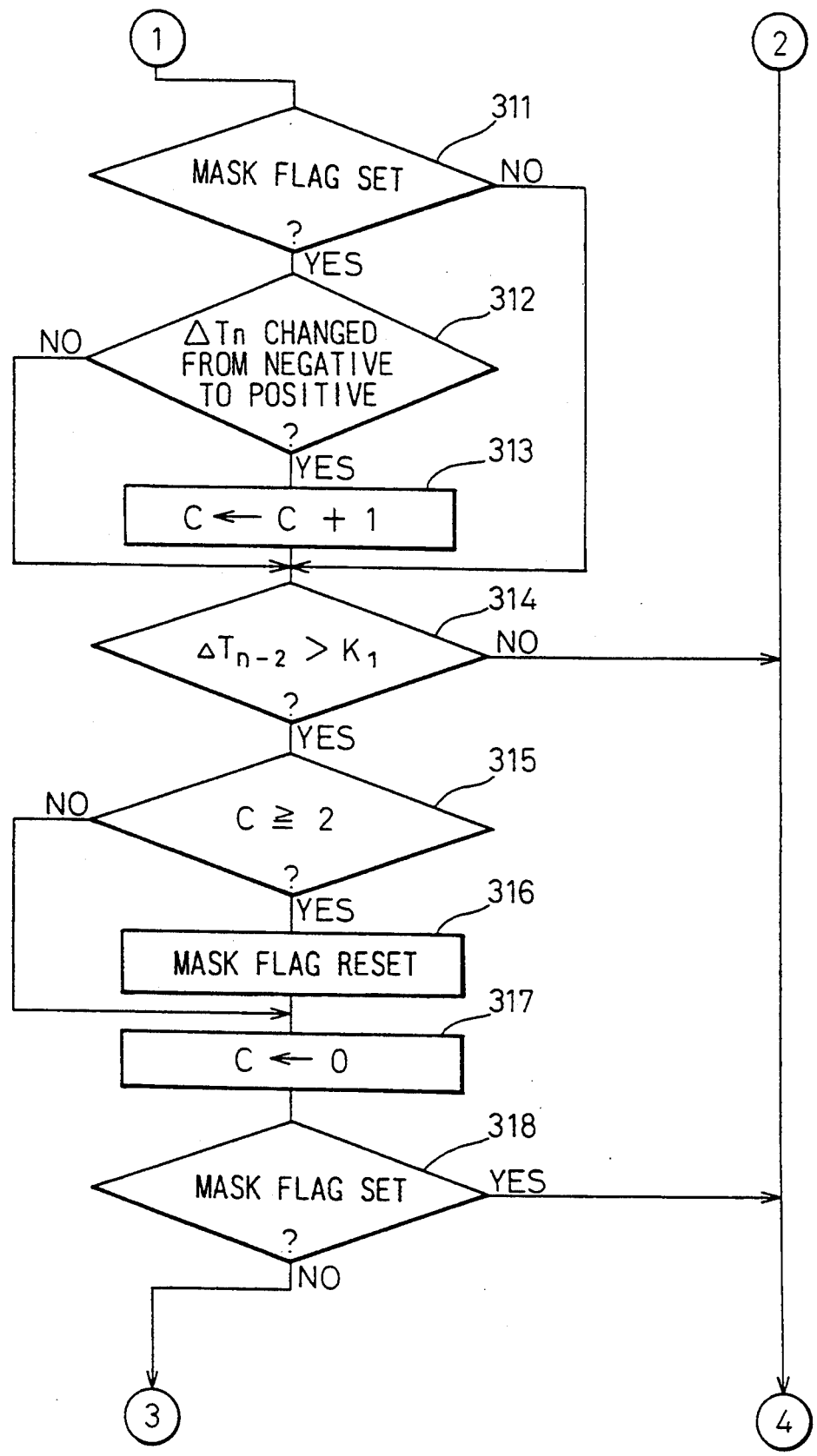
Figure 16C:
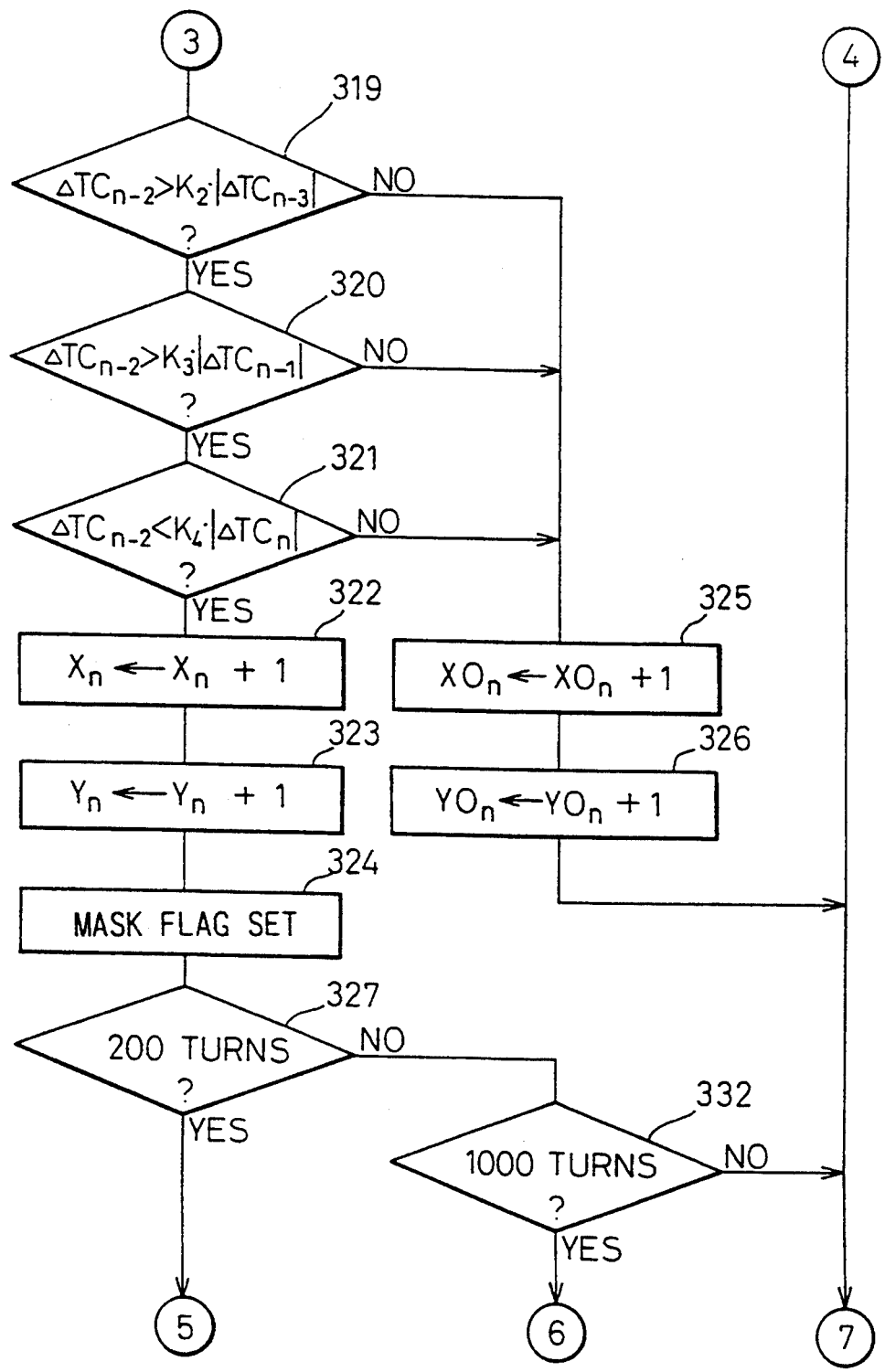
Figure 16D:
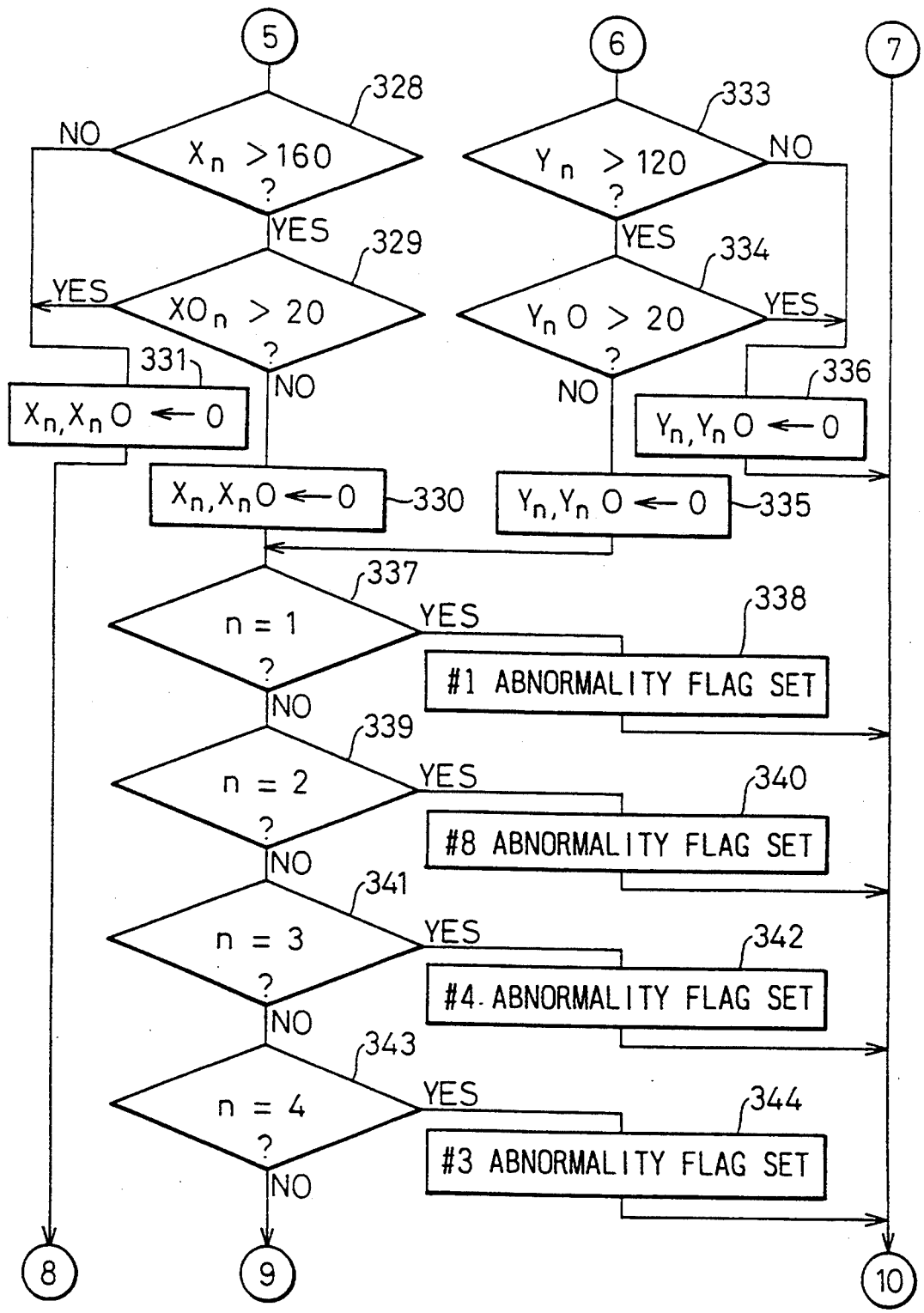
Figure 16E:
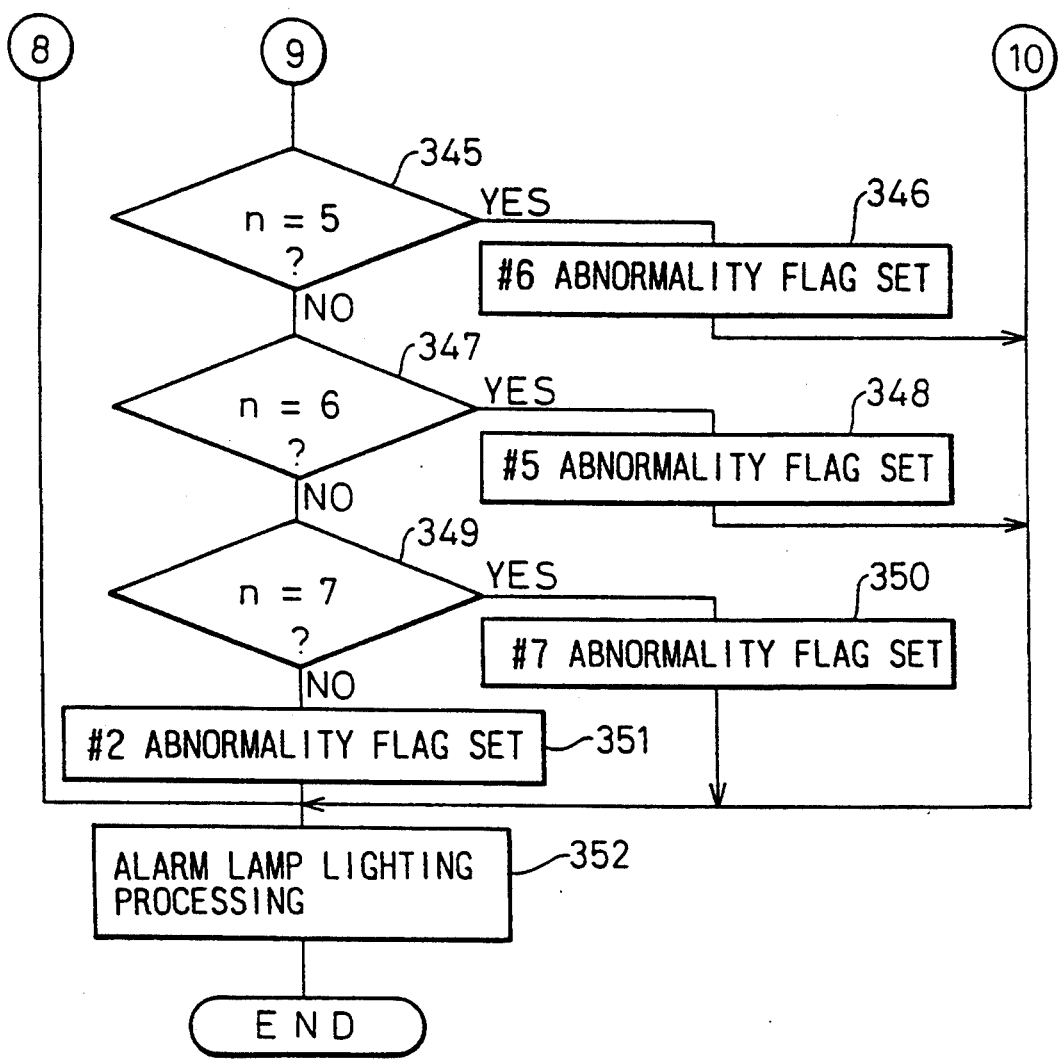

That is, in a V-type eight-cylinder internal combustion engine such as shown in FIG. 13, the elapsed time T at the different cylinders fluctuates as shown in FIG. 15 due to the vibration caused by the reciprocal motion of the pistons even if no misfire occurs. This happens not only in V-type eight-cylinder internal combustion engines, but in in-line eight-cylinder internal combustion engines as well. Further, it occurs in V-type six-cylinder internal combustion engines and in-line six-cylinder internal combustion engines as well. However, a problem occurs when using the above-mentioned $\Delta TC_n$ when the elapsed time T at the different cylinders fluctuates in this way.

That is, if a misfire occurs in for example the #8 cylinder, the elapsed time $T_3$ at the #4 cylinder becomes larger. In this case, looking at the #4 cylinder, $(T_3-T_2)$ becomes positive, while $(T_7-T_6)$ becomes negative, so the value of the $\Delta TC_n$ with respect to the #4 cylinder $(=[(T_3-T_2)-(T_7-T_6)])$ originally becomes a large value and therefore the $\Delta TC_n$ changes a large amount as shown by the broken line M of FIG. 15 if a misfire occurs at the #8 cylinder. Accordingly, at this time, it can be easily judged if the pattern of change of the elapsed time T is the pattern of change of the time of a misfire.

On the other hand, if for example the #1 cylinder misfires, then the elapsed time $T_2$ at the #8 cylinder becomes larger. In this case, however, looking at the #8 cylinder, $(T_2-T_1)$ becomes negative and $(T_6-T_5)$ becomes positive, so the value of $\Delta TC$ $(=[(T_2-T_1)-(T_6-T_5)])$ originally becomes a considerably large negative value. Accordingly, $\Delta TC_n$ changes only a little as shown by the broken line N in FIG. 15 even if a misfire occurs in the #1 cylinder, and therefore at this time it becomes difficult to judge if the pattern of change of the elapsed time T is the pattern of change of the time of a misfire.

Therefore, in the third embodiment, where the elapsed times T in the cylinders fluctuate as shown in FIG. 15, $\Delta TC_n$ is found based on the following equation:

$$\Delta TC_n = [(T_n - T_{n-1}) + (T_{n-8} - T_{n-9})]$$

That is, in the third embodiment, $\Delta TC_n$ is found from the difference between the differences $(T_n - T_{n-1})$ and $(T_{n-8} - T_{n-9})$ between the same adjoining cylinders separated 720 degrees in crank angle from each other. In this case, if no misfire has occurred, then $(T_n - T_{n-1})$ and $(T_{n-8} - T_{n-9})$ become equal, so $\Delta TC_n$ becomes zero, while if a misfire occurs, then $(T_n - T_{n-1})$ becomes larger than $(T_{n-8} - T_{n-9})$, so it is possible to reliably judge if the pattern of change of the elapsed time T becomes the pattern of change of the time of a misfire. FIG. 15 shows the change in the $\Delta TC$ when the #8 cylinder has misfired by the solid line P.

On the other hand, when a misfire occurs successively in the same cylinder, both $(T_{n-1} - T_{n-1})$ and $(T_{n-8} - T_{n-9})$ both become larger, therefore since $\Delta TC_n$ becomes smaller, it becomes impossible to judge from the value of $\Delta TC_n$ if the pattern of change of the elapsed time T is the pattern of change of the time of a misfire. Therefore, in the third embodiment, provision is made of an additional processing routine for detecting successive misfires. In this additional processing routine, when the difference $\Delta T$ has exceeded the set value $K_1$ successively in the same cylinder, it is judged that the cylinder is successively misfiring.

FIGS. 16A, 16B, 16C, 16D, 16E, 17A, 17B, and 17C show the routine for executing a third embodiment of the method of detecting misfiring. This routine is executed by an interruption routine every 90 degrees. Note that even with this routine, it is discriminated if there is a misfire in the cylinder ($\Delta T_{n-2}$) performing the combustion two cylinders earlier than the cylinder with the difference of $\Delta T_n$ when calculating $\Delta T_n$.

The routine shown in FIGS. 16A, 16B, 16C, 16D, and 16E is substantially the same as the routine shown in FIGS. 12A to 12D. That is, referring to FIGS. 16A to 16E, first, at step 300, the count value n is incremented by one. Next, at step 301, the time TIME is made the $TIME_0$. Next, at step 302, the current time TIME counted by the timer 25 is read in. Accordingly, at step 301, the $TIME_0$ expresses the time at the previous interruption. Next, at step 303, the elapsed time $T_n$ is calculated by subtracting the time $TIME_0$ at the previous interruption from the current time TIME. Next, at step 304, the difference $\Delta t_n$ ($=T_{n-2}-T_{n-6}$) for finding the estimated value $\alpha$ is calculated. Next, at step 305, the estimated value $\alpha$ ($=(\Delta t_n+\Delta t_{n-1}+\Delta t_{n-2}+\Delta T_{n-3})/4$) is calculated. Next, at step 306, the difference $\Delta T_n$ of the elapsed time is calculated by subtracting the elapsed time $T_{n-2}$ calculated at the time of the previous interruption from the elapsed time $T_n$ calculated at step 303. Next, at step 307, the final difference $\Delta T_n$ is calculated by subtracting the estimated value $\alpha$ from the difference $\Delta T_n$. Next, at step 308, the $\Delta TC_n$ ($=[(T_n-T_{n-1})-(=T_{n-8}-T_{n-9})]$) used for discrimination of the pattern of change of the elapsed time $T_n$ is calculated, then the routine proceeds to step 309.

At step 309, it is discriminated if the conditions for discrimination of a misfire are satisfied. For example, when the engine has been started and the air-conditioner is switched from OFF to ON and at a gear change of the automatic transmission, it is judged that the conditions for discrimination of a misfire are not satisfied and the routine proceeds to step 352. At other times, it is judged that the conditions for discrimination of a misfire are satisfied and the routine proceeds to step 310. At step 310, successive misfiring detecting processing for detection if successive misfires have occurred is performed. This successive misfiring detecting processing is performed in the routine shown from FIG. 17A to FIG. 17C. This will be explained later. When the successive misfiring detecting process is completed, the routine proceeds to step 311. From step 311 to step 318, the previously mentioned control of the mask flag and zero cross counter C is performed. That is, first, at step 311, it is discriminated if the mask flag has been set. When the mask flag has not been set, the routine jumps to step 314, while when the mask flag has been set, the routine proceeds to step 312. At step 312 it is discriminated if the difference $\Delta T_n$ has changed from a negative to positive value. When the difference $\Delta T_n$ has not changed from a negative to a positive value, the routine jumps to step 314, while when the difference $\Delta T_n$ has changed from a negative to a positive value, the routine proceeds to step 313, where the count value of the zero cross counter C is incremented by one. Next, the routine proceeds to step 314. Therefore, when the mask flag is set, the count value of the zero cross counter C is incremented by one each time the difference $\Delta T_n$ changes from a negative to a positive value.

At step 314, it is discriminated if the elapsed time $\Delta T_{n-2}$ of the explosion stroke of the cylinder which performed combustion two cylinders previously has exceeded the set value $K_1$. When $\Delta T_{n-2} \leq K_1$, the routine jumps to step 352, while when $\Delta T_{n-2} > K_1$, the routine proceeds to step 315. At step 315, it is discriminated if the count value C of the zero cross counter C is more than 2. When C<2, the routine proceeds to step 317, while when $C \geq 2$, the routine proceeds to step 316, where the mask flag is reset, then the routine proceeds to step 317. At step 317, the count value of the zero cross counter C is made zero, then the routine proceeds to step 318, where it is discriminated if the mask flag is set. When the mask flag is set, the routine jumps to step 352, while when the mask flag is not set, the routine proceeds to step 319. Therefore, when $\Delta T_{n-2} > K_1$ and the mask flag is not set, the routine proceeds to step 319.

From step 319 to step 321, it is judged if the pattern of change of the elapsed time $\Delta T_n$ is the pattern of change at the time of a misfire. That is, first, at step 319, it is discriminated if $\Delta TC_{n-2}$ is larger than $K_2 \cdot |\Delta TC_{n-3}|$ (where $K_2$ is a constant). When $\Delta TC_{n-2} \leq K_2 \cdot |\Delta TC_{n-3}|$, the routine proceeds to step 325, while when $\Delta TC_{n-2} > K_2 \cdot |\Delta TC_{n-3}|$, the routine proceeds to step 320. At step 320, it is discriminated if $\Delta TC_{n-2}$ is larger than $K_3 \cdot |\Delta TC_{n-1}|$ (where $K_3$ is a constant). When $\Delta TC_{n-2} \leq K_3 \cdot |\Delta TC_{n-1}|$, the routine proceeds to step 325, while when $\Delta TC_{n-2} > K_3 \cdot |\Delta TC_{n-1}|$, the routine proceeds to step 321. At step 321, it is discriminated if $\Delta TC_{n-2}$ is larger than $K_4 \cdot |\Delta TC_n|$ (where $K_4$ is a constant). When $\Delta TC_{n-2} \leq K_4 \cdot |\Delta TC_n|$, the routine proceeds to step 325, while when $\Delta TC_{n-2} > K_4 \cdot |\Delta TC_n|$, the routine proceeds to step 322.

At step 322, the count value of the counter $X_n$ is incremented by one, then at step 323, the count value of the counter $Y_n$ is incremented by one. Next, at step 324, the mask flag is set, then the routine proceeds to step 327. Accordingly, it is learned that the mask flag is set each time $\Delta K_{n-2}$ becomes greater than $K_1$ and the pattern of change of the elapsed time T becomes the pattern of change of a misfire. On the other hand, at step 325, the count value of the counter $XO_n$ is incremented by one, then at step 326, the count value of the counter $YO_n$ is incremented by one. Accordingly, when $\Delta K_{n-2} > K$, but the pattern of change of the elapsed time T is not the pattern of change of the time of a misfire, the count values of the counters $XO_n$ and $YO_n$ are incremented by one.

At step 327, it is discriminated if the engine has turned 200 times. When the engine has rotated 200 times, the routine proceeds to step 328, where it is discriminated if the count value of the counter $X_n$ provided for each cylinder is larger than 160. When $X_n > 160$, the routine proceeds to step 329, where it is discriminated if the count value of the counter $XO_n$ provided for each cylinder is larger than 20. When $XO_n \leq 20$, the routine proceeds to step 330, where the count values of the counters $X_n$ and $XO_n$ are made zero. Next, the routine proceeds to step 337. Accordingly, the routine proceeds to step 337 when the number $X_n$ of times of judgement of a misfire is over 160 and the frequency by which the pattern of change of the elapsed time T has not become the pattern of change of the time of a misfire during that period is less than a certain percentage. Note that when it is judged that $X_n \leq 160$ at step 328 or it is judged that $XO_n > 20$ at step 329, the routine proceeds to step 331, where the count values of the counters $X_n$ and $XO_n$ are made zero, then the routine proceeds to step 352. The processing from step 328 to step 331 is executed each time the engine rotates 200 times.

On the other hand, when it is judged that the engine has not rotated 200 times, the routine proceeds to step 332, where it is discriminated if the engine has rotated 1000 times. When it is judged that the engine has not rotated 1000 times, the routine jumps to step 352. As opposed to this, when the engine has rotated 1000 times, the routine proceeds to step 333, where it is discriminated if the count value of the counter $Y_n$ set for each cylinder is larger than 120. When $Y_n > 120$, the routine proceeds to step 334, where it is discriminated if the count value of the counter $YO_n$ set for each cylinder is larger than 20. When $YO_n \leq 20$, the routine proceeds to step 335, where the count values of the counters $Y_n$ and $YO_n$ are made zero. Next, the routine proceeds to step 337. Therefore, the routine proceeds to step 337 when the number $Y_n$ of judgements that misfiring has occurred is over 120 and the frequency by which the pattern of change of the elapsed time T has not become the pattern of change of the time of a misfire is less than a certain percentage. Note that when it is judged at step 333 that $Y_n \leq 120$ or at step 334 that $YO_n > 20$, the routine proceeds to step 336, where the count values of the counters $Y_n$ and $YO_n$ are made zero, then the routine proceeds to step 352. The processing from step 333 to step 336 is executed each time the engine rotates 1000 times.

At step 337, it is discriminated if the count value is 1. When n=1, the routine proceeds to step 338, where the #1 abnormality flag is set showing that the #1 cylinder is misfiring, then the routine proceeds to step 352. When n is not equal to 1, the routine proceeds to step 339, where it is discriminated if the count value n is 2. When n=2, the routine proceeds to step 340, where the #8 abnormality flag is set showing that the #8 cylinder is misfiring, then the routine proceeds to step 352. When n is not equal to 2, the routine proceeds to step 341, where it is discriminated if the count value n is 3. When n=3, the routine proceeds to step 342, where the #4 abnormality flag is set showing that the #4 is misfiring, then the routine proceeds to step 352. When n is not equal to 3, the routine proceeds to step 344, where the #3 abnormality flag is set showing that the #3 cylinder is misfiring, then the routine proceeds to step 352.

On the other hand, when n is not equal to 4, the routine proceeds to step 345, where it is discriminated if the count value n is 5. When n=5, the routine proceeds to step 346, where the #6 abnormality flag is set showing that the #6 cylinder is misfiring, then the routine proceeds to step 352. When n is not equal to 6, the routine proceeds to step 349, where it is discriminated if the count value n is 7. When n=7, the routine proceeds to step 350, where the #7 abnormality flag is set showing that the #7 cylinder is misfiring, then the routine proceeds to step 352. When n is not equal to 7, the routine proceeds to step 351, where the #2 abnormality flag is set showing that the #2 cylinder is misfiring, then the routine proceeds to step 352. At step 352, the misfiring cylinder number is stored according to the abnormality flag which has been set and the alarm lamp 30 is lit.

Next, an explanation will be made of the routine for processing for detection of a successive misfire shown in FIGS. 17A, 17B, and 17C.

Figure 17A:
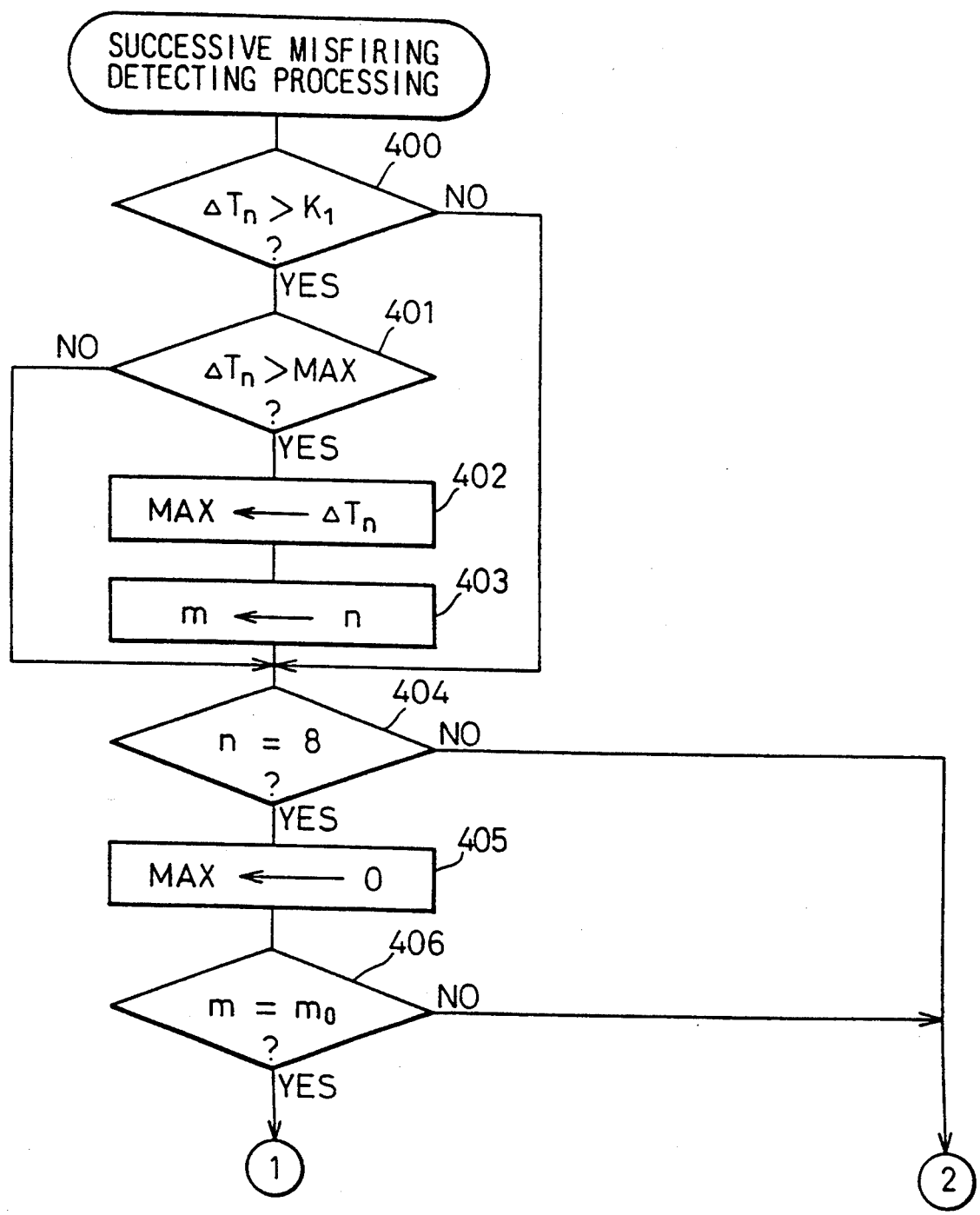
FIGS. 17A, 17B, and 17C are flow charts for detection of successive misfires.
Figure 17B:
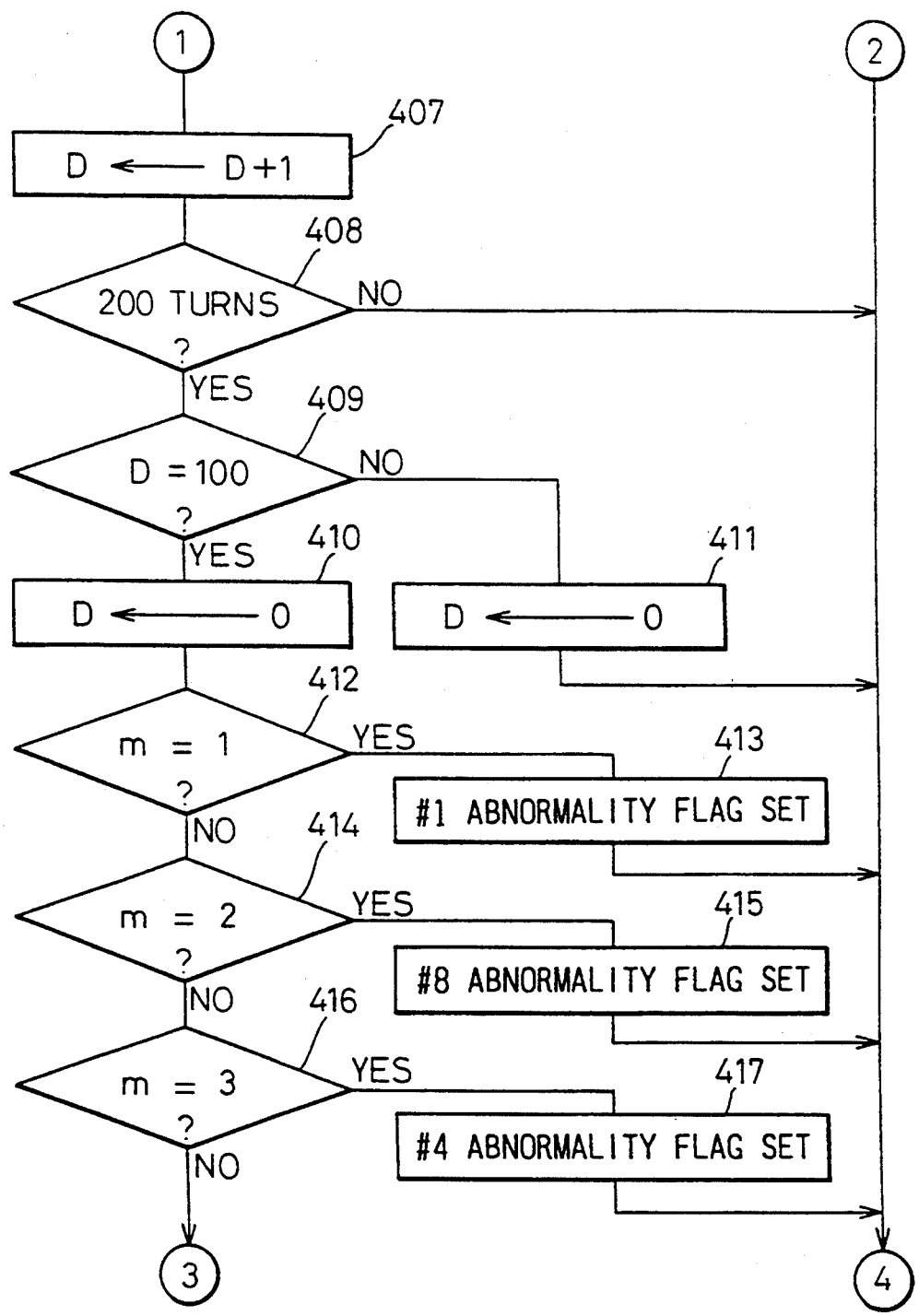
Figure 17C:
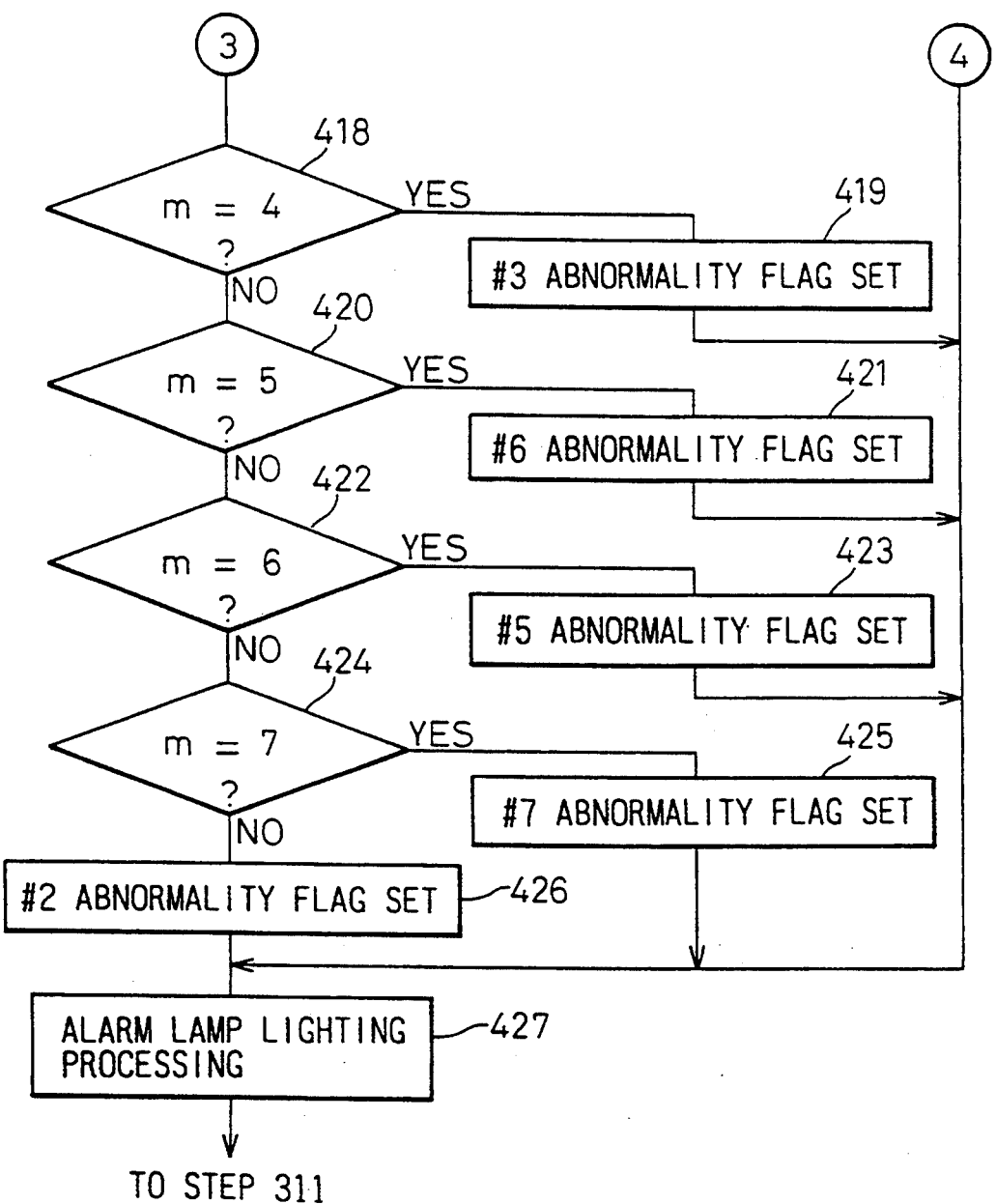

Referring to FIGS. 17A, 17B, and 17C, first, at step 400, it is discriminated if the difference $\Delta T_n$ is larger than the set value $K_1$. When $\Delta T \leq K_1$, the routine jumps to step 404, while when $\Delta T_n > K_1$, the routine jumps to step 401. At step 401, it is discriminated if the difference $\Delta T_n$ is larger than the maximum value MAX. When $\Delta T_n \leq MAX$, the routine jumps to step 404, while when $\Delta T_n > MAX$, the routine steps to step 402. At step 402, the difference $\Delta T_n$ is made MAX, then at step 403, the count value n when the difference $\Delta T_n$ becomes MAX is made m. Then, the routine proceeds to step 404.

At step 404, it is discriminated if the count value n has become 8. When n is not equal to 8, the routine jumps to step 427. As opposed to this, when n has become 8, the routine proceeds to step 405, where MAX is made zero. That is, from step 400 to step 405, the value m showing the cylinder where the difference $\Delta T_n$ has become MAX in the 720 degrees crank angle is calculated.

From the next step 406 to step 411, it is discriminated if misfiring has occurred successively at the same cylinder. That is, at step 406, it is discriminated if the value of m showing the cylinder where the difference $\Delta T$ has become the maximum MAX is equal to the value of $m_0$ showing the cylinder where the difference $\Delta T$ has become the maximum MAX at an interval 720 degrees crank angle previous, that is, if misfiring has occurred successively at the same cylinder. When m is not equal to $m_0$, the routine proceeds to step 427, while when $m = m_0$, that is, when misfiring successively occurs, the routine proceeds to step 407, where the count value D is incremented by one.

Next, at step 408, it is discriminated if the engine has rotated 200 times. Each time the engine rotates 200 times, the routine proceeds to step 409. At step 409, it is discriminated if the count D is 100, that is, if the same cylinder has successively misfired while the engine was rotating 200 times. When D is not equal to 100, the routine proceeds to step 411, the count value D is made zero, then the routine jumps to step 427. As opposed to this, when D=100, that is, when misfiring successively occurs, the routine jumps to step 410, where the count value D is made zero, then the routine proceeds to step 412.

At step 412, it is discriminated if the count value m is 1 or not. When m=1, the routine proceeds to step 413, where the #1 abnormality flag is set showing that the #1 cylinder is misfiring, then the routine proceeds to step 427. When m is not equal to 1, the routine proceeds to step 414, where it is discriminated if the count value m is 2. When m=2, the routine proceeds to step 415, where the #8 abnormality flag is set showing that the #8 cylinder is misfiring, then the routine proceeds to step 427. When m is not equal to 2, the routine proceeds to step 416, where it is discriminated if the count value m is 3. When m=3, the routine proceeds to step 417, where the #4 abnormality flag is set showing that the #4 cylinder is misfiring, then the routine proceeds to step 427. When m is not equal to 3, the routine proceeds to step 418, where the #3 abnormality flag is set showing that the #3 cylinder is misfiring, then the routine proceeds to step 427.

On the other hand, when m is not 4, the routine proceeds to step 420, where it is discriminated if the count value is 5. When m=5, the routine proceeds to step 421, where the #6 abnormality flag is set showing that the #6 cylinder is misfiring, then the routine proceeds to step 427. When m is not 5, the routine proceeds to step 422, where it is discriminated if the count value m is 6. When m=6, the routine proceeds to step 423, where the #5 abnormality flag is set showing that the #5 cylinder is misfiring, then the routine proceeds to step 427. When m is not equal to 6, the routine proceeds to step 424, where it is discriminated if the count value m is 7. When m=7, the routine proceeds to step 425, where the #7 abnormality flag is set showing that the #7 cylinder is misfiring, then the routine proceeds to step 427. When m is not equal to 7, the routine proceeds to step 426, where the #2 abnormality flag is set showing that the #2 cylinder is misfiring, then the routine proceeds to step 427. At step 427, the misfiring cylinder number is stored according to the abnormality flag which has been set and the alarm lamp 30 is lit.

As explained above, according to the present invention, even if a difference in the crankshaft angular velocity should occur between cylinders similar to that during a misfire due to reasons other than a misfire, it is possible to reliably detect from that difference if a misfire has occurred.

While the invention has been described by reference to the specific embodiments chose for purposes of illustration, it should be apparent that numerous modifications could be made thereto by those skilled in the art without departing from the basic concept and scope of the invention.

We claim:

1. A misfire detecting device for a multicylinder internal combustion engine comprising:
   angular velocity detecting means for detecting an angular velocity of a crankshaft at the time of combustion in each of the cylinders;
   angular velocity difference calculating means for calculating a difference in an angular velocity of the crankshaft between firings of the cylinders;
   provisional judging means for provisionally judging if there is a possibility that a misfire has occurred when said difference exceeds a set value;
   storing means for storing a predetermined pattern of change of the angular velocity of the crankshaft representative of the occurrence of a misfire, wherein the predetermined pattern of change is a pattern of values representative of the angular velocity of the crankshaft between successive firings of the cylinders and wherein the predetermined pattern of change is distinguishable from a pattern of change indicative an engine operating condition when the vehicle is driving on a hill; and
   final judging means for finally judging that a misfire has occurred when said provisional judging means has provisionally judged that there is a possibility that a misfire has occurred and the angular velocity of the crankshaft has changed in accordance with the predetermined pattern of change stored in said storing means.

2. A misfire detecting device according to claim 1, further including estimating means for estimating a change in said difference caused by an acceleration of the engine, and correcting means for correcting said difference on the basis of the change in said difference to eliminate the influence of the acceleration of the engine on said difference, wherein said provisional judging means provisionally judges that there is a possibility that a misfire has occurred when said difference corrected by said correcting means exceeds said set value.

3. A misfire detecting device according to claim 2, wherein said angular velocity detecting means detects a time required for a crankshaft to rotate through a predetermined crank angle, and wherein said difference calculated by said angular velocity difference calculating means is a difference between the elapsed time between firings of the cylinders, said correcting means correcting said elapsed time to eliminate the influence of an acceleration of the engine on the elapsed time, and wherein said provisional judging means provisionally judges that there is a possibility that a misfire has occurred when said elapsed time corrected by said correcting means exceeds said set value, said predetermined pattern of change being a pattern of change of said elapsed time representative of the occurrence of a misfire, wherein said final judging means finally judges that a misfire has occurred when said provisional judging means has provisionally judged that there is a possibility that a misfire has occurred and said elapsed time has changed in accordance with the predetermined pattern of change stored in said storing means.

4. A misfire detecting device according to claim 3, wherein said multicylinder engine is comprised of a four-cylinder engine and said predetermined crank angle is 180°, wherein said difference calculated by said angular velocity difference calculating means is a value $\Delta T_n$ obtained by subtracting from the elapsed time $T_n$ between the firing of the most recently fired cylinder and the cylinder fired immediately preceding the most recently fired cylinder n, wherein n shows the sequence of combustion, the elapsed time $T_{n-2}$ of the cylinder n-2 in which combustion was performed two cylinders before the cylinder n, and wherein said provisional judging means provisionally judges that there is a possibility that a misfire has occurred in the cylinder n when said difference corrected by said correcting means exceeds said set value.

5. A misfire detecting device according to claim 4, wherein said difference $\Delta T_n$ is corrected by said correcting means is obtained by the following equations:

$$\Delta T_n = \Delta T_n - \alpha$$

$$\alpha = (\Delta t_n + \Delta t_{n-1})/2$$

$$\Delta t_n = T_{n-1} - T_{n-3},$$

wherein $\Delta t_n$ represents a difference between the elapsed time of the cylinder n-1 and the cylinder n-3 and wherein $\alpha$ is a value representing a difference between the value $\Delta t_n$ and a value $\Delta t_{n-1}$ which represents a difference between the elapsed time of the cylinder n-2 and the cylinder n-4.

6. A misfire detecting device according to claim 4, wherein said predetermined pattern of change is represented by a change in a value $\Delta TC_n$ which is defined by the following equation:

$$\Delta TC_n = [(T_n - T_{n-1}) + (T_{n-2} - T_{n-3})].$$

7. A misfire detecting device according to claim 6, wherein said final judging means judges that said elapsed time has changed in accordance with said predetermined pattern of change stored in said storing means when $\Delta TC_{n-2}$ is larger than both $\Delta TC_{n-1}$ and $\Delta TC_{n-3}$, wherein $\Delta TC_{n-1}$, $\Delta TC_{n-2}$ and $\Delta TC_{n-3}$ are defined by the following equations:

$$\Delta TC_{n-1} = [(T_{n-1} - T_{n-2}) + (T_{n-3} - T_{n-4})]$$

$$\Delta TC_{n-2} = [(T_{n-2} - T_{n-3}) + (T_{n-4} - T_{n-5})]$$

$$\Delta TC_{n-3} = [(T_{n-3} - T_{n-4}) + (T_{n-5} - T_{n-6})]$$

wherein $T_{n-4}$ represents the elapsed time for the previous firing of the cylinder n, $T_{n-5}$ represents the elapsed time for the previous firing of the cylinder n-1 and wherein $T_{n-6}$ represents the elapsed time for the previous firing of the cylinder n-2.

8. A misfire detecting device according to claim 7, wherein said final judging means judges that said elapsed time has changed in accordance with said predetermined pattern of change stored in said storing means when $\Delta TC_{n-2}$ is larger than both $\Delta TC_{n-1}$ and $\Delta TC_{n-3}$ and when $\Delta TC_{n-2}$ is smaller than $\Delta TC_n$.

9. A misfire detecting device of a multicylinder internal combustion engine comprising:

angular velocity detecting means for detecting an angular velocity of a crankshaft;

angular velocity difference calculating means for a calculating a difference between the angular velocity of the crankshaft after the firing of a first cylinder and the angular velocity of the crankshaft after the firing of a second cylinder;

first provisional judging means for provisionally judging that there is a possibility that a misfire has occurred when said difference exceeds a set value;

storing means for storing a predetermined pattern of change of the angular velocity of the crankshaft representative of the occurrence of a misfire, wherein the predetermined pattern of change is a pattern of values representative of the angular velocity of the crankshaft between successive firings of the cylinders and wherein the predetermined pattern of change is distinguishable from a pattern of change indicative of an engine operating condition when the vehicle is driving on a hill;

second provisional judging means for provisionally judging that there is a greater possibility that a misfire has occurred when said first provisional judging means has provisionally judged that there is a possibility that a misfire has occurred and the angular velocity of the crankshaft has changed in accordance with the predetermined pattern of change stored in said storing means;

count means for counting a first number of the times it has been provisionally judged by said second provisional judging means that there is a greater possibility that a misfire has occurred in a first predetermined period of time and a second number of times it has been provisionally judged by said second provisional judging means that no misfire has occurred during the first predetermined period of time; and final judging means for finally judging that a misfire has occurred when the ratio of the second number of the times said second provisional judging means has provisionally judged that no misfire has occurred to the first number of the times said second provisional judging means has provisionally judged that a misfire has occurred is lower than a set ratio.

10. A misfire detecting device according to claim 9, further comprising estimating means for estimating a change in said difference which is caused by acceleration of the engine and correcting means for correcting said difference on the basis of the change in said difference to eliminate the influence of the acceleration of the engine on said difference, wherein said first provisional judging means provisionally judges that there is a possibility that a misfire has occurred when said difference corrected by said correcting means exceeds said set value.

11. A misfire detecting device according to claim 10, wherein said angular velocity detecting means detects an elapsed time required for the crankshaft to rotate through a predetermined crank angle, and wherein said difference calculated by said angular velocity difference calculating means is a difference between the time elapsed between the firings of a first pair of consecutively fired cylinders and the time elapsed between the firings of a second pair of consecutively fired cylinders, wherein said correcting means corrects said elapsed time to eliminate the influence of an acceleration of the engine on said elapsed time and said first provisional judging means provisionally judges that there is a possibility that a misfire has occurred when said elapsed time corrected by said correcting means exceeds said set value, and wherein said second provisional judging means provisionally judges that there is a greater possibility that a misfire has occurred when said first provisional judging means has provisionally judged that there is a possibility that a misfire has occurred and said elapsed time has changed in accordance with the predetermined pattern of change stored in said storing means.

12. A misfire detecting device according to claim 11, wherein said multicylinder engine is comprised of a four-cylinder engine and said predetermined crank angle is 180°, and wherein said difference calculated by said angular velocity difference calculating means is a value $\Delta TC_n$ obtained by subtracting from the elapsed time $T_n$ of a certain cylinder n, wherein n shows the sequence of combustion, the elapsed time $T_{n-2}$ of the cylinder n-2 in which combustion was performed two cylinders before the cylinder n, and wherein said first provisional judging means provisionally judges that there is a possibility that a misfire has occurred in the cylinder n when said difference corrected by said correcting means exceeds said set value.

13. A misfire detecting device according to claim 12, wherein said difference $\Delta T_n$ corrected by said correcting means is obtained by the following equations:

$$\Delta TC_n = T_n - \alpha$$

$$\alpha = (\Delta t_n + \Delta t_{n-1})/2$$

$$\Delta t_n = T_{n-1} - T_{n-3}.$$

14. A misfire detecting device according to claim 12, wherein said predetermined pattern of change in the elapsed time is represented by a change a value $\Delta TC_n$ which is defined as follows:

$$\Delta TC_n = [(T_n - T_{n-1}) + (T_{n-2} - T_{n-3}).$$

15. A misfiring detecting device according to claim 14, wherein said second provisional judging means provisionally judges that said elapsed time has changed in accordance with said predetermined pattern of change stored in said storing means when $\Delta TC_{n-2}$ is larger than both $\Delta TC_{n-1}$ and $\Delta TC_{n-3}$, wherein $\Delta TC_{n-1}$, $\Delta TC_{n-2}$ and $\Delta TC_{n-3}$ are defined by the following equations:

$$\Delta TC_{n-1} = [(T_{n-1} - T_{n-2}) + (T_{n-3} - T_{n-4})]$$

$$\Delta TC_{n-2} = [(T_{n-2} - T_{n-3}) + (T_{n-4} - T_{n-5})]$$

$$\Delta TC_{n-3} = [(T_{n-3} - T_{n-4}) + (T_{n-5} - T_{n-6})]$$

wherein $T_{n-4}$ represents the elapsed time for the previous firing of the cylinder n, $T_{n-5}$ represents the elapsed time for the previous firing of the cylinder n-1 and wherein $T_{n-6}$ represents the elapsed time for the previous firing of the cylinder n-2.

16. A misfire detecting device according to claim 15, wherein said second provisional judging means provisionally judges that said elapsed time has changed in accordance with said predetermined pattern of change stored in said storing means when $\Delta TC_{n-2}$ is larger than both $\Delta TC_{n-1}$ and $\Delta TC_{n-3}$ and when $\Delta TC_{n-2}$ is smaller than $\Delta TC_n$.

17. A misfire detecting device according to claim 9, wherein said final judging means finally judges that a misfire has occurred when said first number of times counted during the first predetermined period of time is larger than a predetermined first value and when said second number of times counted during the first predetermined period of time is lower than a predetermined second value which is smaller than said predetermined first value, wherein the first predetermined period of time is determined so that the engine turns a first predetermined number of times during the first predetermined period of time.

18. A misfire detecting device according to claim 17, wherein said final judging means finally judges that no misfire has occurred when said first number of times counted during the first predetermined period of time is lower than said predetermined first value.

19. A misfire detecting device according to claim 9, wherein said final judging means finally judges that a misfire has occurred when said first number of times counted during the first predetermined period of time is larger than a predetermined first value and when said second number of times counted during the first predetermined period of time is lower than a predetermined second value which is smaller than said predetermined first value, and wherein said counting means counts a third number of the times it has been provisionally judged by said second provisional judging means that there is a greater possibility that a misfire has occurred in a second predetermined period of time, the second predetermined period of time being greater than the first predetermined period of time, and a fourth number of times it has been provisionally judged by said second provisional judging means that no misfire has occurred during the second predetermined period of time, and wherein said final judging means also finally judges that a misfire has occurred when said third number of times counted during the second predetermined period of time is larger than a predetermined third value and when said fourth number of times counted during the second predetermined period of time is lower than a predetermined fourth value which is smaller than said predetermined third value.

20. A misfire detecting device according to claim 9, further comprising prohibiting means for prohibiting a counting operation of said count means when said difference exceeds said set value immediately after said first provisional judging means provisionally judges that there is a possibility that a misfire has occurred.

21. A misfire detecting device according to claim 20, wherein said prohibiting means judges if, after said difference exceeds said set value, said difference changes from a negative value to a positive value and then exceeds said set value, and wherein said prohibiting means prohibits said counting operation when, after said difference exceeds said set value, said difference changes from a negative value to a positive value and then exceeds said set value.

22. A misfire detecting device according to claim 21, wherein said prohibiting means comprises a zero cross counter in which a count value thereof is incremented when said difference changes from a negative value to a positive value and is decremented when said difference exceeds said set value, and wherein said prohibiting means prohibits said counting operation when said count value is lower than predetermined value.

23. A misfire detecting device according to claim 9, further comprising estimating means for estimating a change in said difference which is caused by an acceleration of the engine, and wherein said correcting means corrects said difference on the basis of the estimated change in said difference which is caused by an acceleration of the engine to eliminate the influence of the acceleration of the engine on said difference, wherein said first provisional judging means provisionally judges that there is a possibility that a misfire has occurred when said difference corrected by said correcting means exceeds said set value.

24. A misfire detecting device according to claim 23, wherein said angular velocity detecting means detects an elapsed time during which a crankshaft rotates through a predetermined crank angle, and wherein said difference calculated by said angular velocity difference calculating means is a difference between the time elapsed between the firings of a first pair of consecutively fired cylinders and the time elapsed between the firings of a second pair of consecutively fired cylinders, said correcting means correcting said elapsed times to eliminate the influence of the acceleration of the engine on said elapsed time, wherein said first provisional judging means provisionally judges that there is a possibility that a misfire has occurred when said elapsed time corrected by said correcting means exceeds said set value, wherein said second provisional judging means provisionally judges that there is a greater possibility that a misfire has occurred when said first provisional judging means has provisionally judged that there is a possibility that a misfire has occurred and said elapsed time has changed in accordance with the predetermined pattern of change stored in said storing means.

25. A misfire detecting device according to claim 24, wherein said multicylinder engine is comprised of an eight-cylinder engine, and wherein said predetermined crank angle is 90° and said difference calculated by said difference calculating means is a value $\Delta T_n$ obtained by subtracting form the elapsed time $T_n$ of a cylinder n, wherein n shows the sequence of combustion, the elapsed time $T_{n-2}$ of the cylinder n-2 in which combustion was performed two before cylinder n, and wherein said first provisional judging means provisionally judges that there is a possibility that a misfire has occurred in the cylinder n-1 when said difference corrected by said correcting means exceeds said set value.

26. A misfire detecting device according to claim 25, wherein said difference $\Delta T_n$ corrected by said correcting means is obtained by the following equations:

$$\Delta T_n = \Delta T_n - \alpha$$

$$\alpha = (\Delta t_n + \Delta t_{n-1})/4$$

$$\Delta t_n = T_{n-1} - T_{n-3}$$

wherein $\Delta t_n$ represents a difference between the elapsed time of the cylinder n-1 and the cylinder n-3 and wherein $\alpha$ is a value representing a difference between the value $\Delta tn_n$ and a value $\Delta t_{n-1}$ which represents a difference between the elapsed time of the cylinder n-2 and the cylinder n-4.

27. A misfire detecting device according to claim 25, wherein said pattern of change in said elapsed time is represented by a change in a value $\Delta TC_n$ which is defined by the following equation:

$$\Delta TC_n = [(T_n - T_{n-1}) + (T_{n-2} - T_{n-3})].$$

28. A misfire detecting device according to claim 27, wherein said final judging means judges that said elapsed time has changed in accordance with said predetermined pattern of change stored in said storing means when $\Delta TC_{n-2}$ is larger than both $\Delta TC_{n-1}$ and $\Delta TC_{n-3}$.

29. A misfire detecting device according to claim 28, wherein said final judging means judges that said elapsed time has changed in accordance with said predetermined pattern of change stored in said storing means when $\Delta TC_{n-2}$ is larger than both $\Delta TC_{n-1}$ and $\Delta TC_{n-3}$ and when $\Delta TC_{n-2}$ is smaller than $\Delta TC_n$.

30. A misfire detecting device according to claim 9, further comprising successive misfiring judging means for judging that successive misfiring occurred in a specific cylinder when it is provisionally judged by said first provisional judging means that there is a possibility that misfiring has occurred successively in said specific cylinder.

* * * * *

UNITED STATES PATENT AND TRADEMARK OFFICE
CERTIFICATE OF CORRECTION

PATENT NO.    :   5,442,955                         Page 1 of 2
DATED         :   August 22, 1995
INVENTOR(S)   :   Yasutoshi BABA et al.

It is certified that error appears in the above-identified patent and that said Letters Patent is hereby corrected as shown below:

| Column | Line | |
|---|---|---|
| 2 | 55 | Change "is occurring" to --has occurred--. |
| 5 | 23 | After "angle" inert --,--. |
| 5 | 24 | After "stroke" insert --,--; change "#cylinder" to --#1 cylinder--. |
| 5 | 28 | Change "explosions" to --explosion--. |
| 7 | 1 | After "of" delete "the". |
| 9 | 14 | Change "$TC_3$" to --$\triangle TC_3$--. |
| 10 | 7 | Change "$_2>K_4$" to $_2<K_4$--. |
| 10 | 63 | After "time T" delete "to" |
| 13 | 58 | Change "C>2" to --C<2--. |
| 13 | 67 | Change "been not" to --not been--. |
| 15 | 5 | Change "has" to --is--. |
| 21 | 39 | After "#4" insert --cylinder--. |

UNITED STATES PATENT AND TRADEMARK OFFICE
CERTIFICATE OF CORRECTION

PATENT NO.   : 5,442,955
DATED        : August 22, 1995
INVENTOR(S)  : Yasutoshi BABA et al.

It is certified that error appears in the above-identified patent and that said Letters Patent is hereby corrected as shown below:

| Column | Line | |
|--------|------|---|
| 23 | 16 | Change "chose" to --chosen--. |
| 23 | 41 | After "indicative" insert --of--. |
| 24 | 31 | After "$\Delta T_n$" delete "is". |
| 26 | 47 | After "change" inset --in--. |
| 26 | 50 | Change "...$T_{n-3}$)." to --...$T_{n-3}$)].--. |
| 28 | 32 | Change "time" to --times--. |
| 28 | 48 | Change "form" to --from--. |
| 28 | 51 | After "two" insert --cylinders--. |

Signed and Sealed this

Twenty-sixth Day of March, 1996

Attest:

BRUCE LEHMAN

Attesting Officer           Commissioner of Patents and Trademarks